United States Patent [19]
Ohmori et al.

[11] Patent Number: 5,970,035
[45] Date of Patent: Oct. 19, 1999

[54] DISC DEVICE THAT CONTROLS THE INCIDENT ANGLE OF A LIGHT BEAM STRIKING A DISC

[75] Inventors: Kiyoshi Ohmori; Hidekazu Seto, both of Kanagawa, Japan

[73] Assignee: Sony Corporation, Tokyo, Japan

[21] Appl. No.: 08/849,906

[22] PCT Filed: Oct. 28, 1996

[86] PCT No.: PCT/JP96/03150

§ 371 Date: Jun. 18, 1997

§ 102(e) Date: Jun. 18, 1997

[87] PCT Pub. No.: WO97/15922

PCT Pub. Date: May 1, 1997

[30] Foreign Application Priority Data

Oct. 26, 1995 [JP] Japan .................................. 7-300524

[51] Int. Cl.[6] .............................. G11B 7/00; G11B 19/20
[52] U.S. Cl. ....................... 369/54; 369/58; 369/44.32; 369/44.27
[58] Field of Search ..................... 369/44.32, 44.27, 369/50, 54, 58, 124, 94

[56] References Cited

U.S. PATENT DOCUMENTS 4,918,678  4/1990  Dolby ....................................... 369/127
5,056,075  10/1991 Maruta et al. ......................... 369/44.32
5,729,510  3/1998  Kasahara et al. ..................... 369/44.14

FOREIGN PATENT DOCUMENTS

| 0461912 A2 | 12/1991 | European Pat. Off. . |
| 0482964 A2 | 4/1992 | European Pat. Off. . |
| 0571986 A1 | 12/1993 | European Pat. Off. . |
| 61-57319 | 4/1986 | Japan . |
| 3-37611 | 4/1991 | Japan . |
| 6-20294 | 1/1994 | Japan . |

*Primary Examiner*—Thang V. Tran
*Attorney, Agent, or Firm*—Limbach & Limbach L.L.P.

[57] ABSTRACT

An optical disc driving device employing an optical disc as a recording medium. The device includes a skew control mechanism for controlling relative tilt between an optical disc and an objective lens for selectively recording and/or reproducing data on or from a first optical disc having a standard recoding density and a second optical disc having a high recording density. The relative tilt between the second optical disc and the objective lens is controlled by the skew control mechanism only when the second optical disc is loaded and data is recorded and/or reproduced on or from the second optical disc.

19 Claims, 30 Drawing Sheets

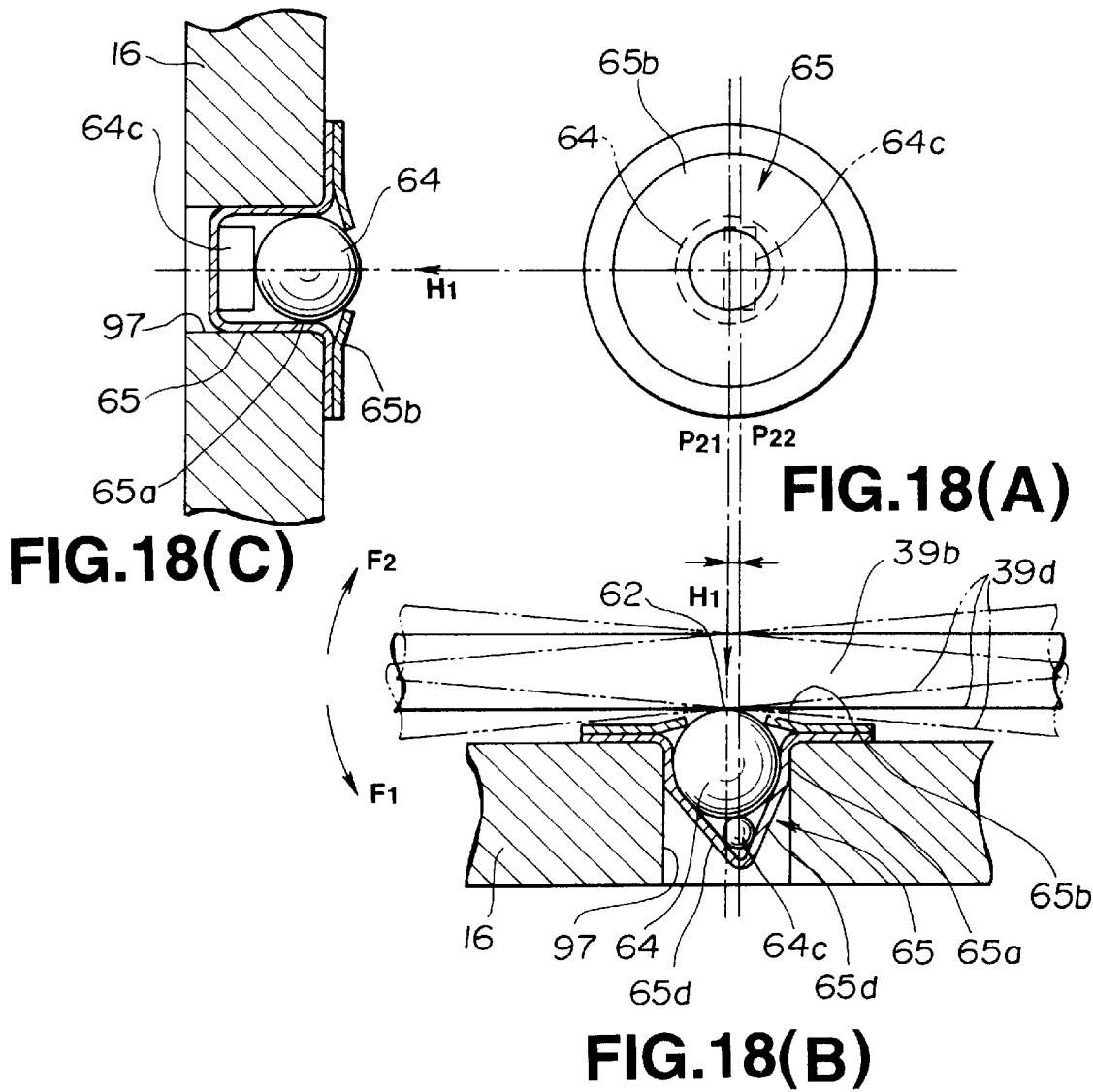

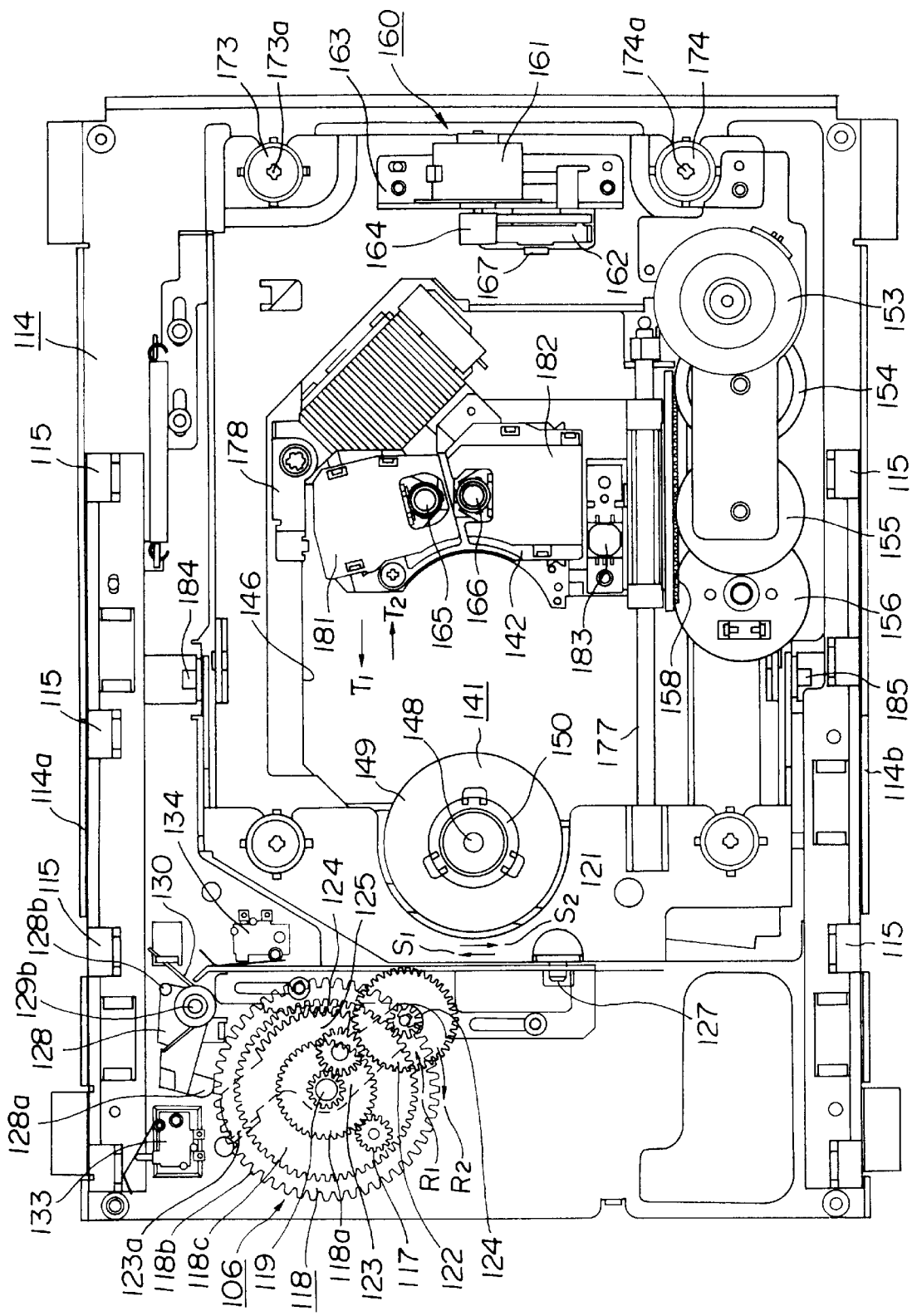

DISC DEVICE THAT CONTROLS THE INCIDENT ANGLE OF A LIGHT BEAM STRIKING A DISC

TECHNICAL FIELD

This invention relates to an optical disc driving device whereby plural sorts of the optical discs different in design formats, such as recording capacity, can be selectively employed.

BACKGROUND ART

Up to now, an optical disc enabling information signals to be recorded and/or reproduced using an optical beam has been used. Among the optical discs of this sort in use, there are a read-only compact disc (CD) having pre-recorded music data or information data to be processed by a computer, and a CD-ROM.

There have also been proposed a high-density (HD) disc or a high density (HD)-CD-ROM having the recording density twice or three times as high as that of the CD or CD-ROM having the standard recoding density.

There is also proposed a digital versatile disc/digital video disc (DVD) as an optical disc having the same size as but having the recording density seven to eight times as high as the CD or the CD-ROM.

Also in use is a magneto-optical disc which is a recording/reproducing optical disc having the same size as the CD or CD-ROM and capable of re-recording data signals.

An optical disc drive device, having the above optical discs as a recording medium, has a disc table which is run in rotation by a spindle motor and in which the optical disc is set in a horizontal position. The signal recording surface of the optical disc, thus rotated, is scanned across its inner and outer rims by a light beam radiated from an optical pickup for recording/reproducing data on or from the optical disc. The light beam radiated from the optical pickup is radiated perpendicularly on the signal recording surface of the optical disc as it is converged for being focused on the signal recording surface.

For recording and/or reproducing data on or from the optical disc with satisfactory recording/reproducing characteristics, it is desirable that the light beam radiated from the optical pickup be incident perpendicularly on the signal recording surface of the optical disc. With the light beam being incident perpendicularly on the signal recording surface of the optical disc, a beam spot of the light beam converged by the objective lens for being radiated on the signal recording surface of the optical disc becomes truly circular, as a result of which the beam spot can correctly scan a recording track formed on the signal recording surface of the optical disc for recording and/or reproducing data with good recording/reproducing characteristics.

Meanwhile, in consideration of warping of an optical disc and mounting accuracy of a spindle motor or an optical pickup, a pre-set allowance is provided in an optical disc driving device employing an optical disc as a recording medium by a standard with respect to a relative tilt between the signal recording surface of the optical disc and the optical axis of the objective lens converging and radiating the light beam on the optical disc.

For example, in an optical disc driving device employing an optical disc, such as a CD or CD-ROM 12 cm in diameter, as a recording medium, the allowance of the relative tilt between the optical axes of the optical disc and the objective lens is unified at 1.2° or less. That is, the relative tilt of 1.2° or less between the optical axis of the optical disc and that of the objective lens with respect to the optical axis of the objective lens perpendicular to the signal recording surface of the optical disc is allowed. Specifically, the allowance of the tilt of the objective lens is set to 0.6° or less, while that of the spindle motor or of the objective lens on the device is set to 0.6° or less.

On the other hand, with an optical disc, such as HD-CD or HD-CD-ROM, having a recording density higher than that of a CD or a CD-ROM having a standard recording density, not only the recording track for data recording is reduced in width, but also the track pitch is reduced for increasing the recording density per unit area for improving the recording density.

In an optical disc drive device employing the optical disc of such high recording density as a recording medium, it is necessary to set verticality of the objective lens with respect to the optical disc to a higher accuracy. If, when the optical disc of high recording density is used as a recording medium, the verticality of the objective lens with respect to the optical disc is not maintained at high accuracy, the beam spot of the light beam radiated on the signal recording surface is distorted in shape and narrow in width such that the recording track of narrow pitch width cannot be scanned correctly. For example, it may be an occurrence that a sole beam spot radiates the neighboring recording tracks simultaneously such that the light beam radiated on a pre-set recording track is reduced in energy density with the result that data recording/reproduction cannot be performed correctly.

This it is not possible to record and/or reproduce data on or from an optical disc of high recording density with the use of an optical disc player employing a CD or a CD-ROM having a standard recording density.

DISCLOSURE OF THE INVENTION

It is therefore an object of the present invention to provide an optical disc device whereby data can be selectively recorded and/or reproduced on or from a first optical disc having a standard recording density, such as a CD or a CD-ROM, and a second optical disc having a recording density higher than that of the first optical disc, such as a HD-CD or HD-CD-ROM.

It is another object of the present invention to provide an optical disc device whereby it may be discriminated whether the loaded optical disc is a first optical disc having a standard recording density or a second optical disc having a higher recording density for controlling tilt of the objective lens with respect to the optical disc for realization of high-precision skew control.

It is yet another object of the present invention to provide an optical disc device in which the device itself can be reduced in thickness despite the fact that the device has a skew control mechanism for adjusting the relative tilt between the optical disc and the objective lens with a view towards realization of selective recording and/or reproduction of data on or from an optical disc having a standard recording density and a second optical disc having a higher recording density.

An optical disc driving device of the present invention, proposed for accomplishing the above object, includes a skew control mechanism for controlling relative tilt between an optical disc and an objective lens for selectively recording and/or reproducing data on or from a first optical disc having a standard recording density and a second optical disc having a high recording density. The relative tilt between the second optical disc and the objective lens is controlled by the skew control mechanism only when the second optical disc is loaded and data is recorded and/or reproduced on or from the second optical disc.

The skew control mechanism according to the present invention controls tilt of the spindle motor rotationally driving the optical disc for controlling the relative tilt between the objective lens and the second optical disc.

The skew control mechanism according to the present invention controls relative tilt between the objective lens and the optical disc by securing the spindle motor rotationally driving the optical disc and by controlling the tilt of the optical pickup carrying the objective lens.

BRIEF DESCRIPTION OF THE DRAWINGS

FIGS. 18a–18c are side cross-sectional view showing still another embodiment of the rotational fulcrum point.

FIG. 26 is a plan view of the optical disc drive device in a state in which the disc tray has been pulled to the loading position.

BEST MODE FOR CARRYING OUT THE INVENTION

Figure 1:
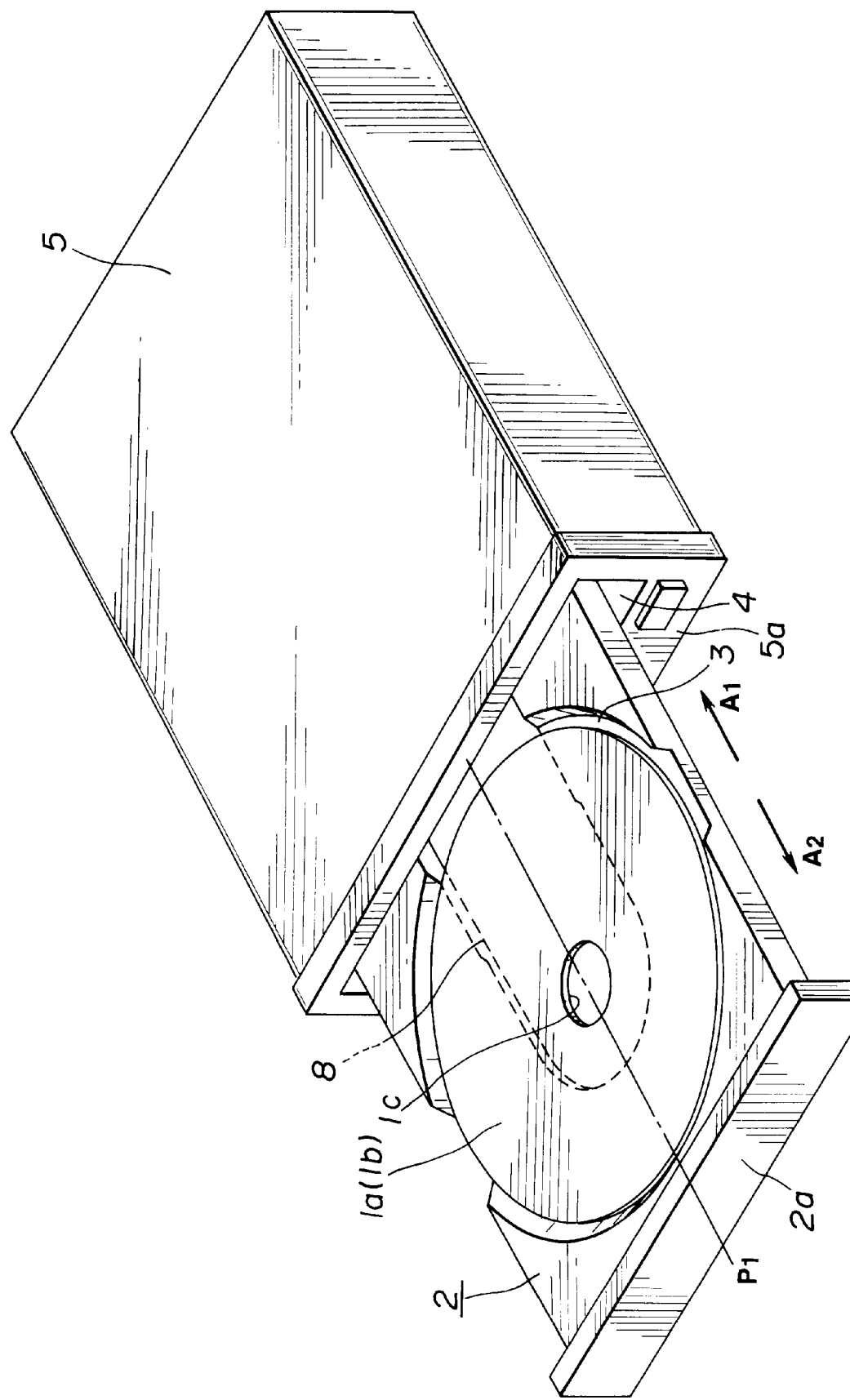
FIG. 1 is a perspective view showing an optical disc driving device according to a first embodiment of the present invention and showing the state in which a disc tray has been pulled out to a position enabling loading/unloading of the optical disc.

Referring to the drawings, a first embodiment of the optical disc drive device according to the present invention is explained in detail.

The present optical disc driving device is configured for selectively reproducing a first optical disc 1a of 12 cm in diameter having a standard recording density, such as CD or CD-ROM, or a second optical disc 1b similarly of 12 cm in diameter having a higher recording density, such as HD-CD or HD-CD-ROM.

The present optical disc device has a disc tray movable horizontally across the inside and the outside of the main body portion of the device, and performs loading of the first or second optical disc 1a, 1b using this disc tray.

In addition, the present optical disc drive device is used as an external storage device of a computer.

Schematics of Optical Disc Drive Device

The outline of the optical disc drive device of the present embodiment is first explained.

The optical disc drive device has a disc tray 2 movable horizontally across the inside and the outside of a main body portion 5 of the device, as shown in FIG. 1. The disc tray 2 has a dished disc holder 3 on its upper surface. The optical disc 1a or 1b, reproduced by the present optical disc drive device, is accommodated so that it is set on the bottom surface of the disc holder 3 of the disc tray 2. When the disc tray 2 has been pulled out of the main body portion 5 of the device, as shown in FIG. 1, the disc holder 3 faces the outside of the main body portion 5 of the device for enabling insertion and ejection of the first or second optical discs 1a, 1b.

Figure 2:
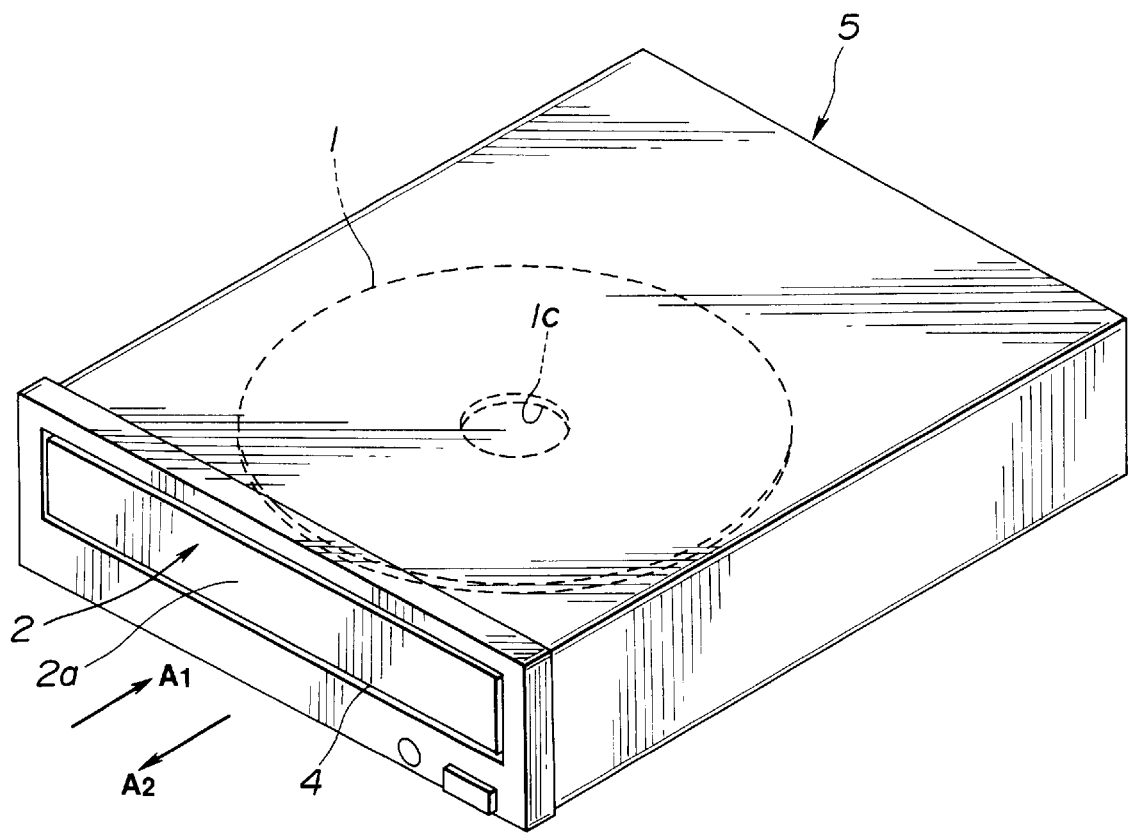
FIG. 2 is a perspective view of the optical disc driving device showing the optical disc loading state in which the disc tray has been pulled into the inside of a main body portion of the device.

For loading the first or second optical discs 1a, 1b, the disc tray 2 is pulled out of the main body portion 5 of the device and the first or second optical discs 1a, 1b to be reproduced is set on the disc holder 3. If now a front side 2a of the disc tray 2 pulled out of the main body portion 5 of the device is thrust in a direction indicated by arrow $A_1$ in FIG. 1, the disc tray 3 acts as a loading switch, not shown, provided within the main body portion 5 of the device. On actuation of the loading switch, the disc tray 2 is horizontally pulled by a loading driving mechanism, as later explained, in a direction as indicated by arrow $A_1$ in FIG. 1 towards the inside of the main body portion 5 of the device via a tray inlet/outlet formed in a front panel 5a of the main body portion 5 of the device, as shown in FIG. 2. When the disc tray 2 is completely accommodated within the main body portion 5 of the device, as shown in FIG. 2, the first or second optical discs 1a, 1b, held on the disc holder 3, are automatically horizontally loaded on the disc table run in rotation by the spindle motor.

If, after loading of the first or second optical discs 1a, 1b, a playback command signal is entered from a host computer, the spindle motor starts to be driven, such that the first or second optical discs 1a, 1b, held on the disc holder 3, are run in rotation at a constant linear velocity (CLV) or at a constant angular velocity (CAV). With start of rotation of the first or second optical discs 1a, 1b, the optical pickup starts to be driven. As the light beam radiated from a light source, such as a semiconductor laser, scans the signal recording area of the first or second optical discs 1a, 1b, the optical pickup reads out data recorded on the first or second optical discs 1a, 1b.

If, after reproduction of desired data recorded on the first or second optical discs 1a, 1b, an ejection command signal is inputted from the host computer, the disc tray 2 is moved in a direction shown by arrow $A_2$ in FIG. 1, corresponding to the direction of ejection proceeding from the tray inlet/outlet 4 to outside of the main body portion 5 of the device. This ejection operation comes to a close when the disc holder 3 has been pulled out of the main body portion 5 of the device, as shown in FIG. 1.

Schematics of Loading Mechanism

The loading mechanism of loading the first or second optical disc 1a or 1b is hereinafter explained.

Figure 3:
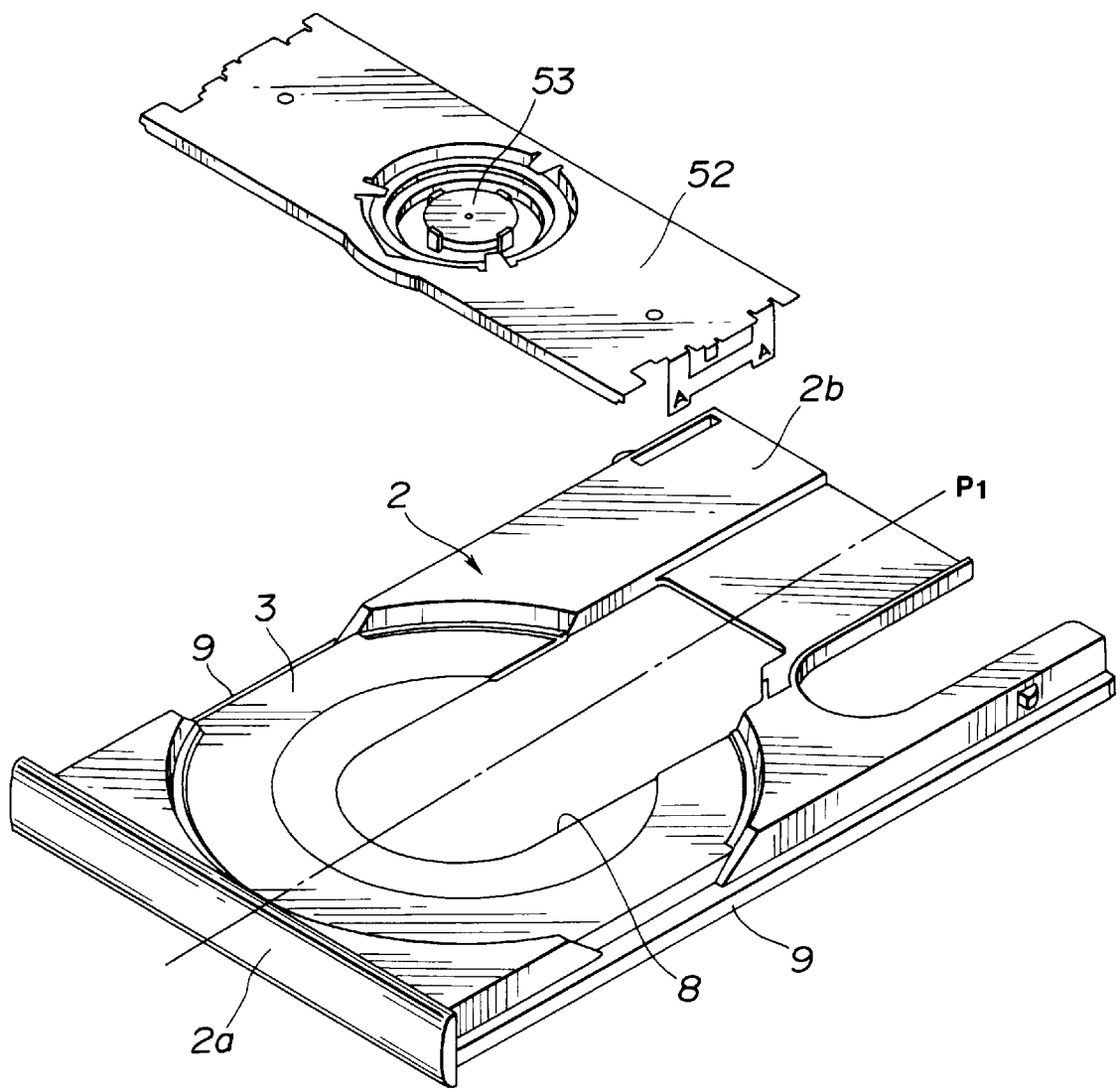
FIG. 3 is a perspective view showing the relation between the disc tray and the disc clamper.
Figure 4:
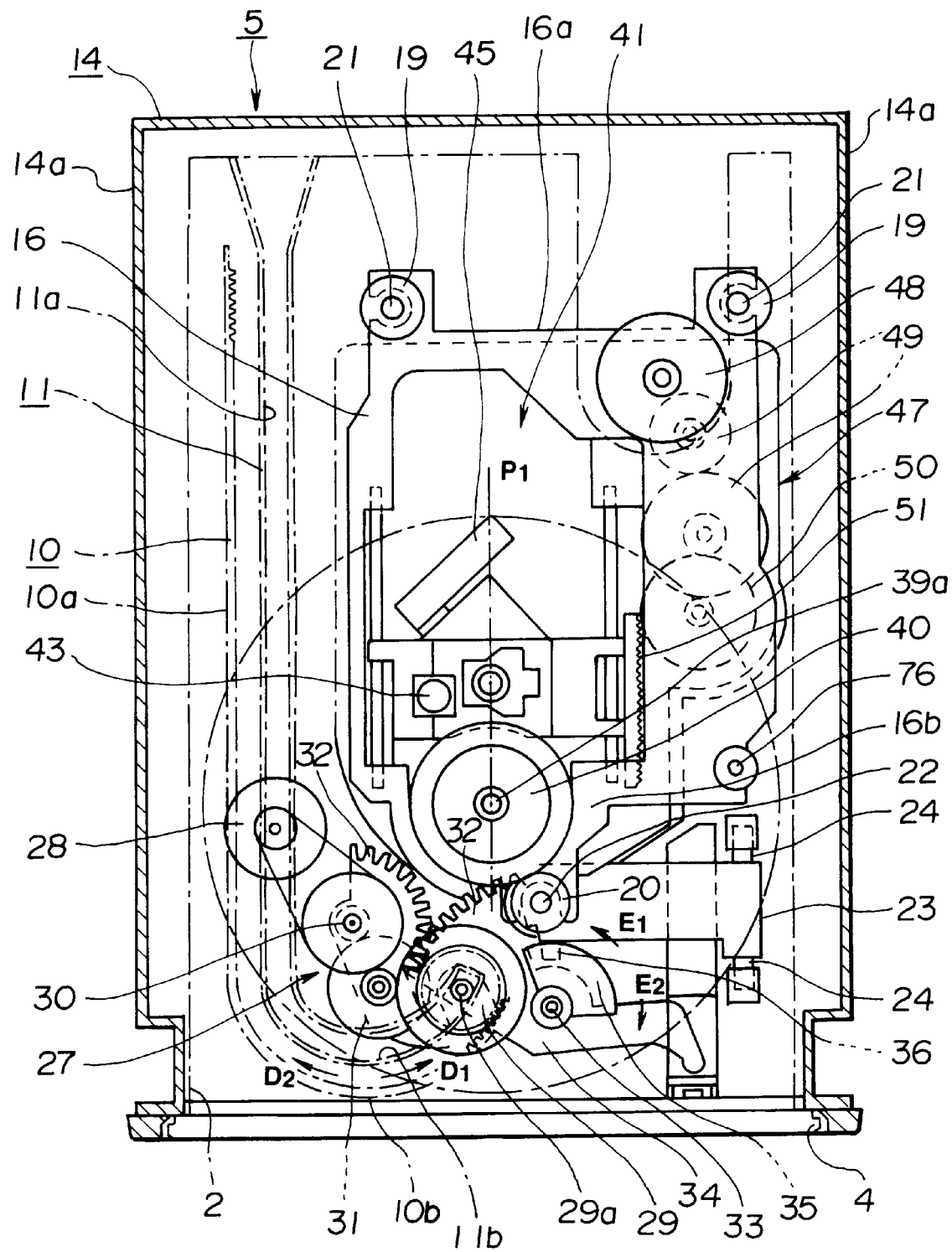
FIG. 4 is a plan view showing a lift frame and a driving mechanism for the device.

The loading mechanism includes a disc tray 2 for transporting the first or second optical discs 1a, 1b, reproduced by the present optical disc driving device, across the inside and the outside of the main body portion 5 of the device, as shown in FIG. 1. The disc tray 2, produced on molding a synthetic resin material, is formed with an elongated bottom opening 8 extending along a tray centerline $P_1$ from the center of the disc holder 3 as far as a rear end 2b positioned inwardly of the main body portion 5, as shown in FIG. 3. On both lateral sides of the disc tray 2 parallel to its movement direction are formed left-hand and right-hand side guide rails 9 parallel to the tray centerline P1. On a lateral side of the bottom surface of the disc tray 2 are formed a rack gear 10 and a rack groove 11 for extending parallel to the movement direction of the disc tray 2, as shown in FIG. 4. The rack gear 10 and the rack groove 11 are J-shaped in their entirety and delimit a semi-circular arcuate portion on the front side 2a. That is, the rack gear 10 and the rack groove 11 are formed by linear portions 10a, 11a extending parallel to the tray centerline $P_1$ and arcuate portions 10b, 11b formed at the end portions towards the front side 2a of the linear portions 10a, 11a, respectively.

Within the inside of the main body portion 5 is arranged a chassis 14 in the from of a shallow rectangular box formed of e.g., synthetic resin, as shown in FIG. 4. The disc tray 2 is supported by its left and right side guide rails 9 supported by plural tray guides 15 integrally molded with the chassis 14 on the inner sides of left and right side plates 14a, 14a thereof, and are guided by these tray guides 15 in a direction extending between the inside and the outside of the main body portion 5 as indicated by arrows $A_1$ and $A_2$ of FIG. 1.

Figure 7:
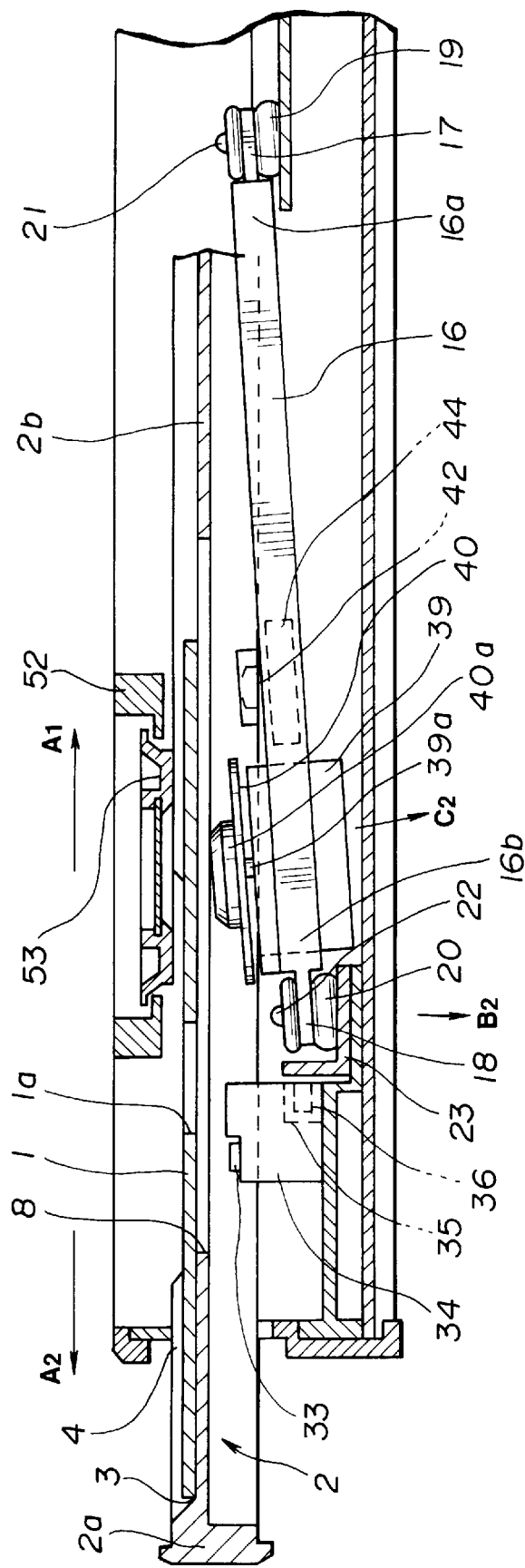
FIG. 7 is a side cross-sectional view showing the state of ejecting the disc tray.
Figure 8:
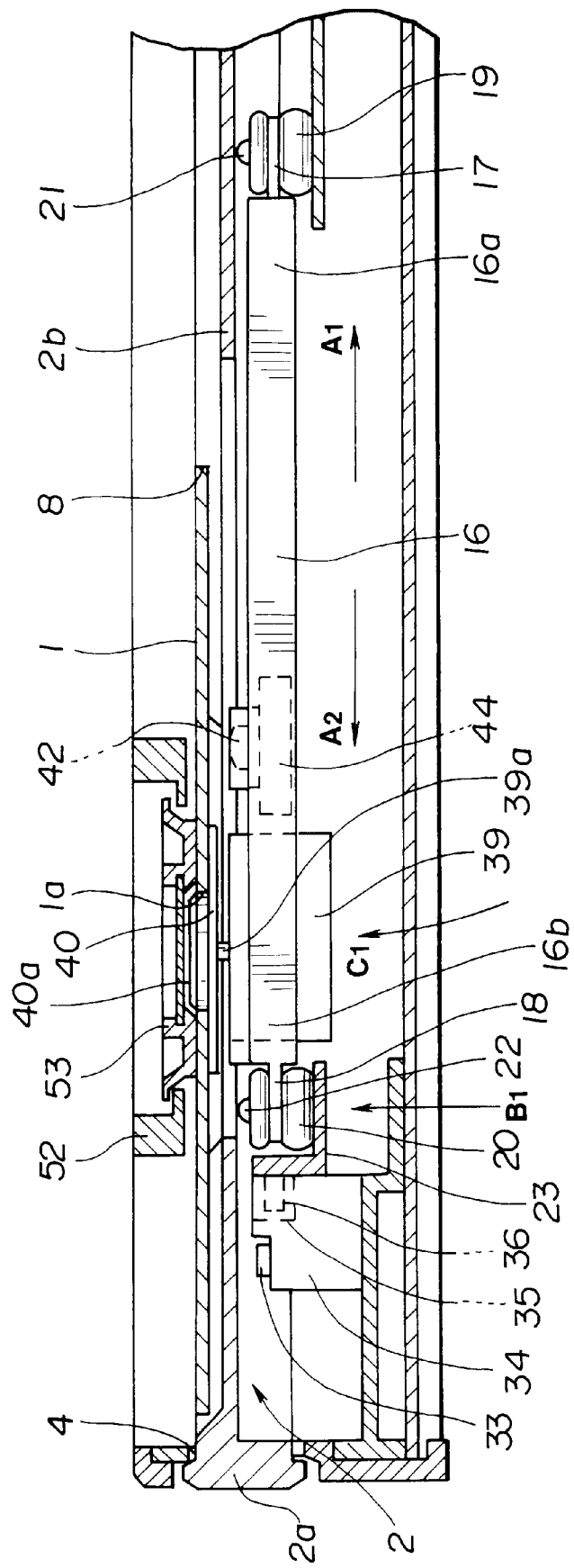
FIG. 8 is a side cross-sectional view of the optical disc drive device showing the disc loading state.

On the bottom surface 14b of the chassis 14 is mounted a lift frame 16 formed by molding a synthetic resin material, as shown in FIG. 4. The lift frame 16 is formed with left-hand and right-hand side insulator mounting portion 17, 17 and a center insulator mounting portion 18, as shown in FIG. 4. The insulator mounting portions 17, 17 are formed towards the rear end 16a on the inner side of the main body portion 5, while the center mounting portion 18 is formed on the front end 16b on the front side of the main body portion 5. Three insulators 19, 19, 20 formed of an elastic material, such as rubber, are mounted via these insulator mounting portions 17, 18. The left and right side insulators 19, 19, mounted on the rear end 16a of the lift frame 16, are mounted on the bottom surface 14b of the chassis 14 by set screws 21 inserted into mid portions thereof, as shown in FIGS. 4, 7 and 8. The insulator 20, mounted on the front end 16b of the lift frame 16, is mounted on the foremost part of a lift driving lever 23 by a set screw 22 inserted in its mid portion, as shown in FIGS. 4, 7 and 8. The lift driving lever 23 is arranged at right angles with the tray centerline P1, as shown in FIG. 4. The lift driving lever 23 is mounted on the bottom portion 14b of the chassis 14 via left and right horizontal supporting pins 24 protuberantly formed on both sides of the proximal portion for rotation in directions shown by arrows $B_1$ and $B_2$ in FIG. 6 corresponding to the vertical direction. When the lift driving lever 23 is rotated in a direction indicated by arrows $B_1$ or $B_2$ in FIG. 6, the lift frame 16 is lifted or lowered by being rotated in a direction shown by arrow $C_1$ in FIG. 7 or by an arrow $C_2$ in FIG. 8, corresponding to the vertical direction, with left and right insulators 19, 19 on the rear end 16a as fulcrum points.

The upper surface of the lift frame 16 is formed with a dished disc driving unit mounting portion 25.

Figure 6:
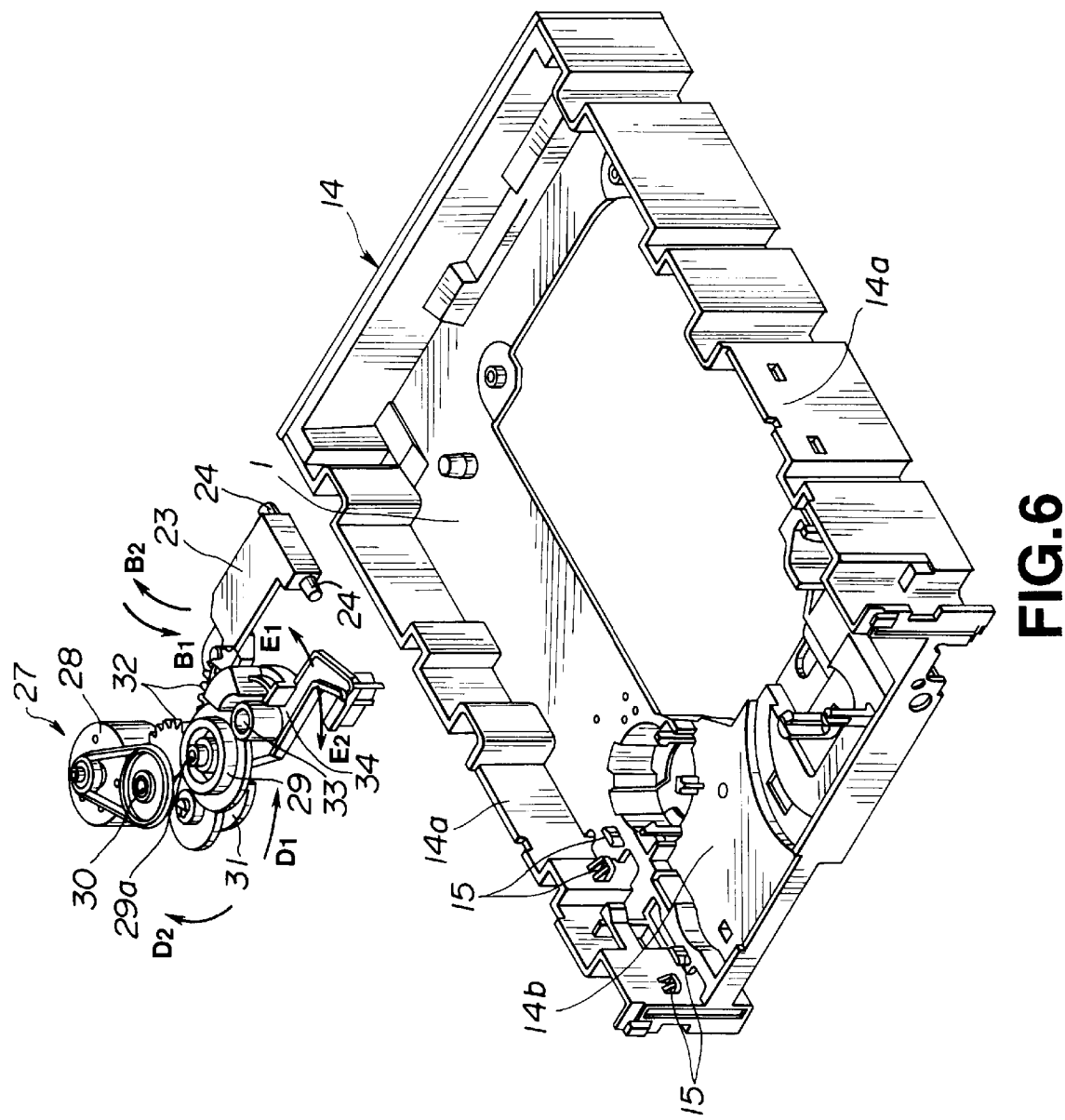
FIG. 6 is an exploded perspective view showing the loading driving mechanism and a chassis.

A loading driving mechanism 27, configured for moving the disc tray 2 and for lifting the lift frame 16, is mounted on the bottom portion 14b of the chassis 14 on a lateral side towards the front end 16b of the lift frame 16, as shown in FIGS. 4 and 6. The loading driving mechanism 27 includes a loading motor 28, and a pinion gear 29 run in rotation in the forward and reverse directions by this loading motor 28. The loading driving mechanism 27 also includes a pinion lever 31 for swinging a center shaft 29a of the pinion gear 29 about a vertically extending supporting shaft 30 in a horizontal plane in directions indicated by arrows $D_1$ and $D_2$ in FIG. 6, and a cam lever 34 driven by a pair of sector gears 32 by this pinion lever 31 about a vertically extending supporting shaft 33 in directions indicated by arrows $E_1$ and $E_2$ in FIG. 6. The loading driving mechanism 27 similarly includes a vertically stepped cam groove 35 formed arcuately around the supporting shaft 33 of the cam lever 34 and a cam follower pin 36 formed as one with the foremost lateral side if the lift driving lever 23 so as to be loosely fitted in the cam groove 35. The pinion gear 29 meshes with the rack gear 10 of the disc tray 2, with the center shaft 29a of the pinion gear 29 being loosely fitted in the guide groove 11.

With the loading driving mechanism 27, the center shaft 29a of the pinion gear 29 is guided within the J-shaped guide groove 11 formed in the disc tray 2 for moving the pinion gear 29 along the J-shaped rack gear 10 of the disc tray 2.

That is, during loading of the disc tray 2, the linear portion 10a of the rack gear 10 is linearly driven from the rear end 2b towards the front side 2a of the disc tray 2 by the pinion gear 29 driven in the forward and reverse directions by the loading motor 28 for horizontally pulling the disc tray 2 in a direction of arrow $A_1$ in FIG. 4 proceeding towards the inside of the main body portion 5.

If, by continued forward rotation of the pinion gear 29 by the loading motor 28, the pinion gear 29 is swung in a direction indicated by arrow $D_1$ in FIG. 4 along the arcuate path of the track gear 10, the pinion lever 31 causes the cam lever 34 to be rotated via a pair of sector gears 32 in a direction indicated by arrow $E_1$ in FIG. 4. If the cam lever 34 is rotated in a direction indicated by arrow $E_1$ in FIG. 4, the cam follower pin 36 of the lift driving lever 23 is lifted by the cam groove 35 formed in the cam lever 34 in a direction indicated by arrow B in FIG. 8, corresponding to the upward direction. This causes the lift driving frame 16 to be lifted via insulator 20 from an obliquely downwardly inclined lower position shown in FIG. 7 to a horizontal rased position shown in FIG. 8, in a direction indicated by arow $C_1$ in FIG. 8, about the left and right insulators 19, 19 as center.

The disc tray 2 is ejected by an operation reversed from the loading operation. That is, while the pinion gear 29, run in rotation in the reverse direction by the loading motor 28, is swung in a direction indicated by arrow $D_2$ in FIG. 4 along the arcuate path 10b of the rack gear 10, the cam lever 34 is run in rotation in a direction indicated by arrow $E_2$ in FIG. 4 for moving the cam follower pin 36 by a cam groove 35 formed in the cam lever 34 in a direction indicated by arrow $B_2$ in FIG. 7 corresponding to the downward direction for lowering the lift frame 16 by the lift driving lever 36 via insulator 20 from the upper position shown in FIG. 8 to the lower position shown in FIG. 7 in a direction shown by arrow $C_2$ in FIG. 7 with the left and right insulators 19, 19 as center.

By continued reversed rotation of the pinion gear 29 by the loading motor 28, the linear portion 10a of the rack gear 10 is driven linearly by the pinion gear 29 from the front side 2a towards the rear end 2b of the disc tray 2, for pulling out the disc tray 2 in a direction indicated by arrow $A_2$ in FIG. 4 proceeding towards outside the main body portion 5.

Schematics of the Disc Driving Unit

The disc driving unit for reproducing the first or second optical disc 1a, 1b, loaded by the above-described loading mechanism, is hereinafter explained.

The disc driving unit is mainly comprised of a spindle motor 39 for running the loaded first or second optical disc 1a, 1b in rotation, an optical pickup 41 for reading out data recorded on the first or second optical disc 1a, 1b rotationally driven by the spindle motor 39 and a disc clamper 53 for clamping the first or second optical disc 1a, 1b, set on the disc table 40 run in rotation by the spindle motor 39 in cooperation with the disc table 40.

Referring to FIGS. 4, 7 and 8, the spindle motor 39 is mounted upright within the disc driving unit holding portion 25 of the lift frame 16 at a position offset towards the front end 16b. The disc table 40 is mounted horizontally as one with the upper end of a motor shaft 39a of the spindle motor 39. The upper mid portion of the disc table 40 is formed as one with a centering member 40a engaged n a center aperture 1c of the first optical disc 1a or the second optical disc 1b.

Figure 5:
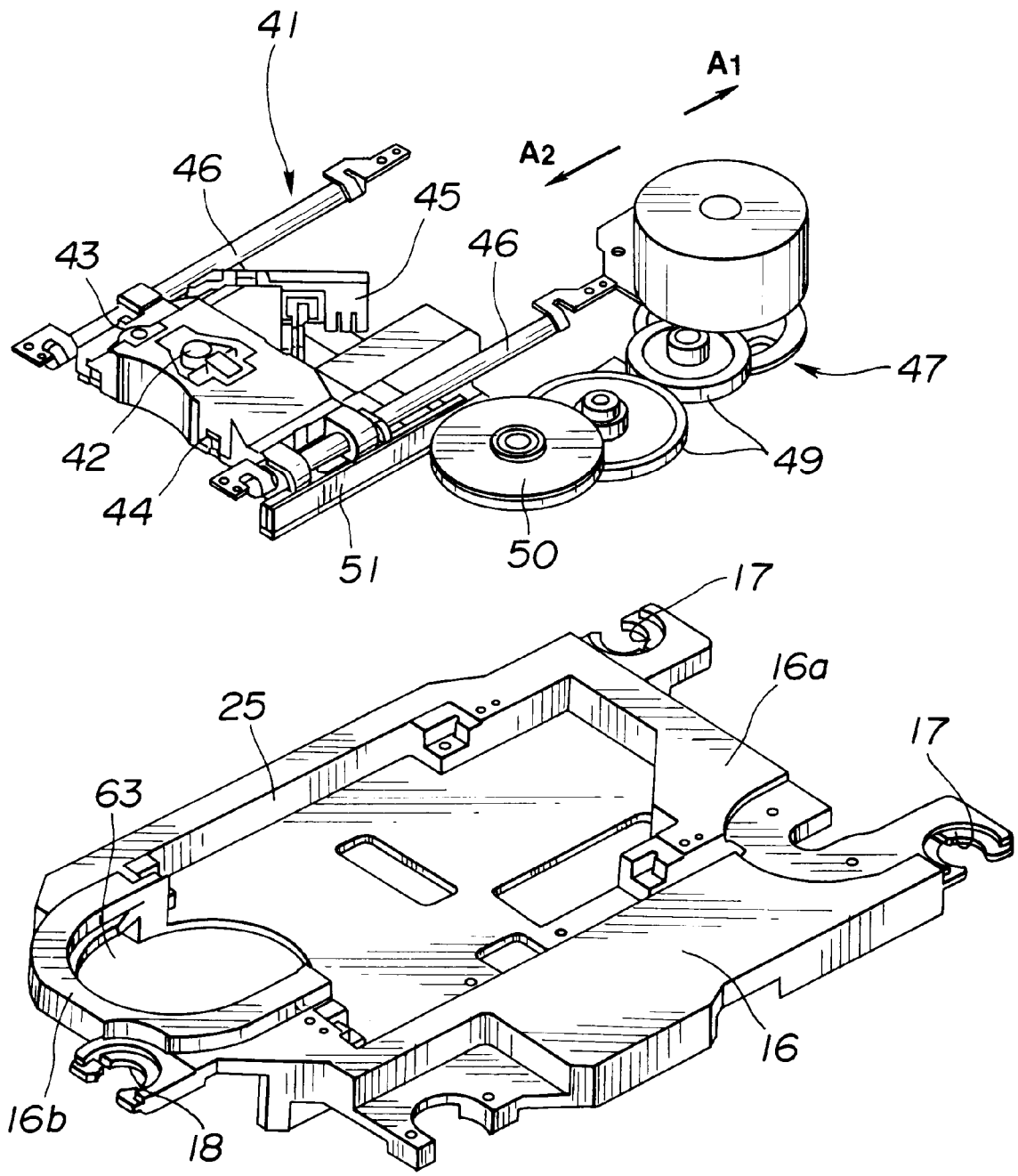
FIG. 5 is a perspective view showing an optical pickup and a lift frame.

Within the the disc driving unit holding portion 25 of the lift frame 16 of the lift frame 16 is horizontally mounted the optical pickup 41 rearwardly of the spindle motor 39. The optical pickup 41 has a carriage 44 within which are mounted upright an objective lens 42 and a light reflection type skew sensor 43, as shown in FIG. 5. The light beam is incident on the objective lens 42, the reflected light from which is incident on an optical block 45 mounted integrally on a lateral side of the carriage 44.

The lift frame 16 has a carriage movement mechanism 47 mounted thereon, as shown in FIG. 5. The carriage movement mechanism 47 is configured for linearly moving the carriage 44 along left and right side guide shafts 46, 46 in directions indicated by arrows $A_1$ and $A_2$ in FIG. 4. The carriage movement mechanism 47 includes a pinion gear 50, rotationally driven in the forward and reverse directions by a carriage driving motor 48 via a gear train 49, and a rack gear 51 mounted on a lateral side of the carriage 44 for being linearly driven by the pinion gear 50.

The spindle motor 39 and the objective lens 42 are arranged on the tray centerline P1, while the objective lens 42 is arranged on the optical pickup 41 for movement along the tray centerline $P_1$ in directions indicated by arrows $A_1$ and $A_2$ in FIG. 4.

A disc damper supporting plate 52 is mounted horizontally across the upper ends of left and right side plates 14a of the chassis 14 for traversing the upper portion of the disc tray 2. On the disc clamper supporting plate 52 is held a disc clamper 53 at a position directly above the disc table 40, as shown in FIG. 3. The disc clamper 53 is held at a mid portion of the disc table 40 for movement in the up-and-down, left-and-right and in the fore-and-aft directions within preset limits.

Unloading of the Optical Disc from the Disc Table and Playback Operation

When the first or second optical disc 1a, 1b is pulled into the inside of the main body portion of the device 5 by the disc tray 2 and loaded on the disc table 40, with the lift frame 16 being lifted to the upper horizontal position, as shown in FIG. 8, the disc table 40 is protruded upwards via bottom aperture 8 formed in the disc tray 2, with the centering member 40a being engaged from below with a center aperture 1c in the first or second optical disc 1a or 1b. By the disc table 40, the first or second optical disc 1a or 1b is floated upwards within the disc holder 3 of the disc tray 2, while the disc 1a or 1b is clamped horizontally on the disc table 40 by the disc clamper 53, for completing the loading.

If, after the first or second optical disc 1a or 1b is loaded in position, a playback command signal is supplied from a host computer to the optical disc driving device, the spindle motor 39 starts to be driven so that the first or second optical disc 1a, 1b is rotated at a high velocity with CLV or CAV. With start of driving of the spindle motor 39, the carriage 44 of the optical pickup 41 is moved by the carriage movement mechanism 47 in a direction indicated by arrow $A_1$ or $A_2$ in FIG. 4, with the objective lens 42 being moved in the same direction along the tray centerline P1.

Figure 9:
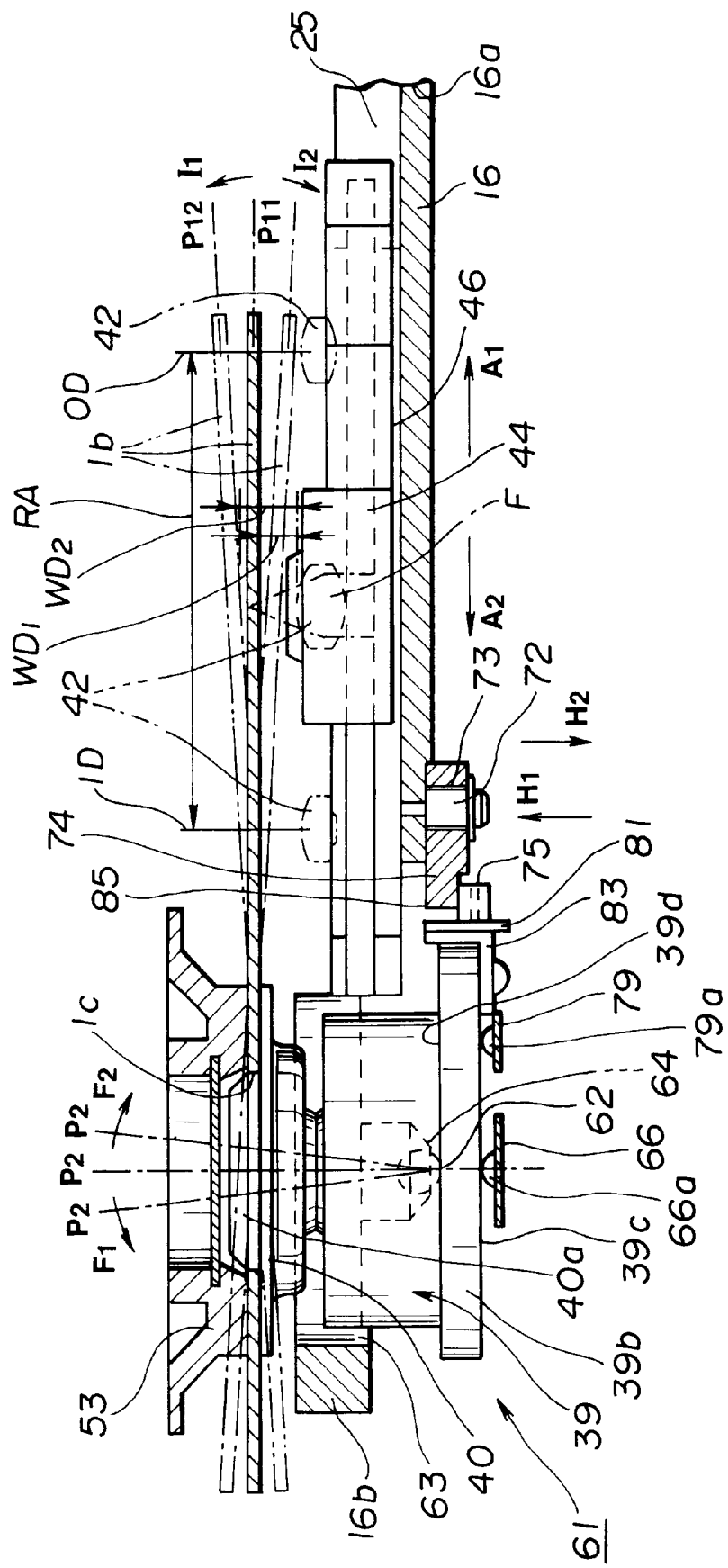
FIG. 9 is a cross-sectional view along line IX—IX of FIG. 11 for illustrating the skew control mechanism of the optical disc driving device.

The objective lens 42 is moved at this time along the tray centerline $P_1$ in a direction indicated by arrow $A_1$ or $A_2$ through a recording area RA between an innermost position ID and an outermost position OD of the optical disc 1 as indicated by a chain-dotted line and a double-dotted chain line in FIG. 9, respectively.

The light beam radiated from the optical block 45 is directed by the objective lens 42 on to the signal recording surface of the first or second optical disc 1a, 1b, while the return light reflected from the signal recording surface falls on the optical disc 45 so as to be detected by a photodetector provided in the optical pickup 41 for reading out data recorded on the first or second optical disc 1a, 1b.

Meanwhile, the carriage movement mechanism 47 causes the carriage 44 to be moved along left and right guide shafts 46, 46 in directions indicated by arrows $A_1$ or $A_2$ in FIG. 9, by the pinion gear being run in rotation in the forward and reverse directions by the carriage driving motor 48 via gear train 49 for linearly driving the rack gear 51.

If, after the desired data recorded on the first or second optical disc 1a, 1b, an ejection command signal is entered from the host computer to the optical disc device, the lift frame 16 is lowered to its lower position in a direction indicated by arrow $C_2$ in FIG. 7, so that the disc table 40 is detached downwards from the first or second optical disc 1a, 1b. The first or second optical disc 1a, 1b is then set horizontally within the disc holder 3 of the disc tray 2. The disc tray is then pulled out of the main body portion 5 to complete the ejection operation.

Skew Control Mechanism

A skew control mechanism 61, configured for controlling the relative tilt between the optical pickup 41 and the first or second optical disc 1a, 1b, is now explained.

Figure 10:
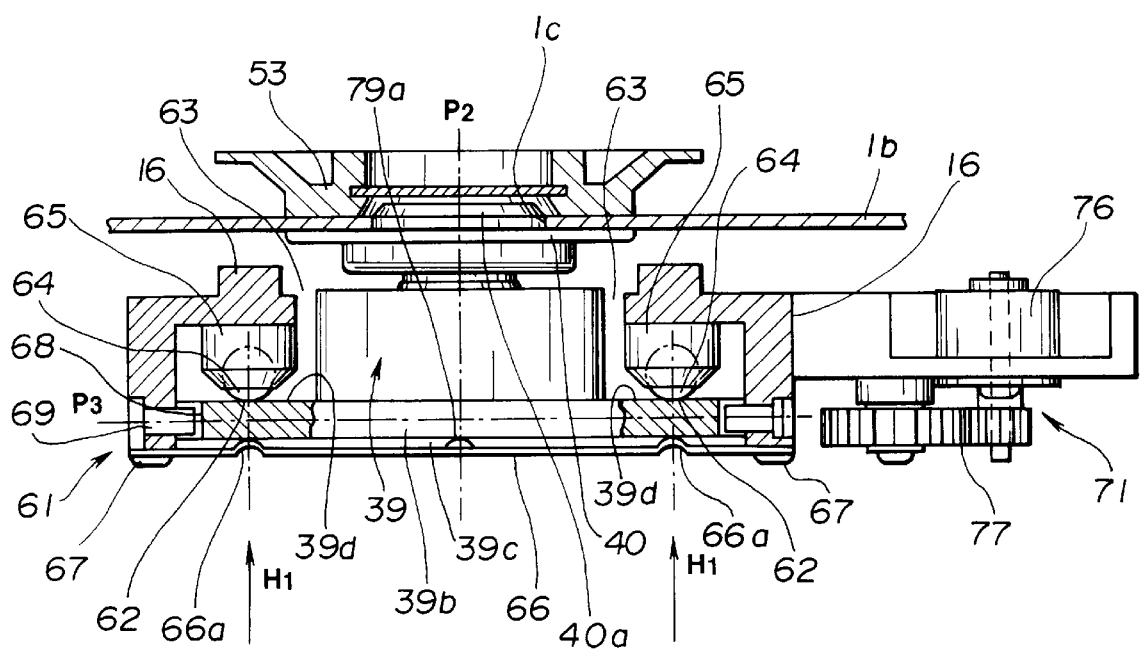
FIG. 10 is a cross-sectional view along line X—X of FIG. 11 showing essential portions of the skew control mechanism.

Referring to FIG. 9, the skew control mechanism 61 is configured for adjusting the tilt of the spindle motor 39 in directions indicated by arrows $F_1$ and $F_2$ n FIG. 9 along the tray centerline $P_1$, about left and right rotational pivots 62 arranged on left and right sides of the spindle motor 39, as shown in FIG. 10, on a horizontal reference line $P_3$ passing through the axis $P_2$ of the spindle motor 39 and extending at right angles with the tray centerline $P_1$, as shown in FIG. 9.

Figure 11:
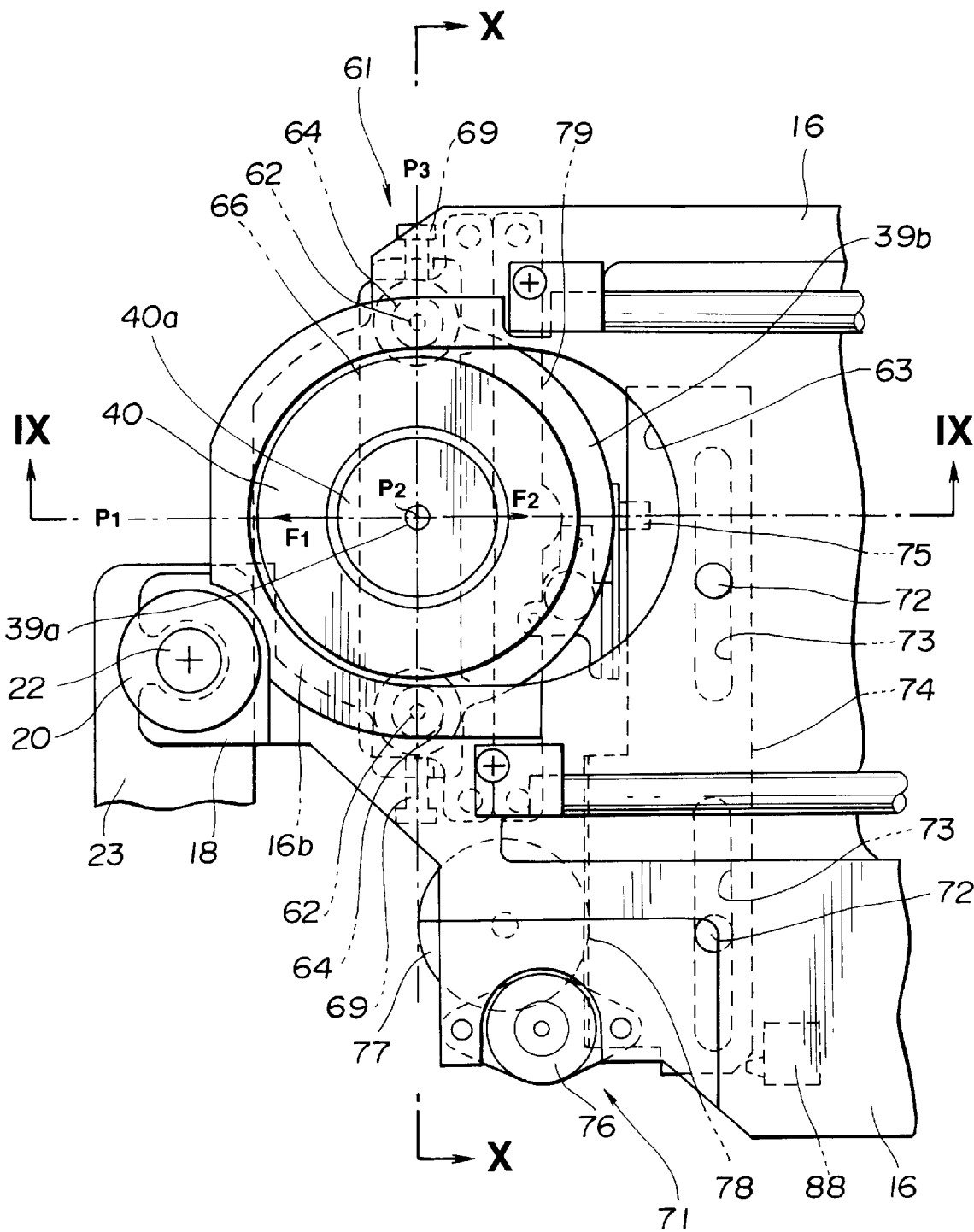
FIG. 11 is a plan view showing the skew control mechanism.

The spindle motor 39 is arranged within a cylindrical opening 63 formed in the front end 16b of the lift frame 16, as shown in FIG. 11. A pair of balls 64 operating as left and right rotational pivots 62, are mounted vertically downwardly on left and right sides of the opening 63 by left and right ball holders 65, as shown in FIG. 10.

Figure 14:
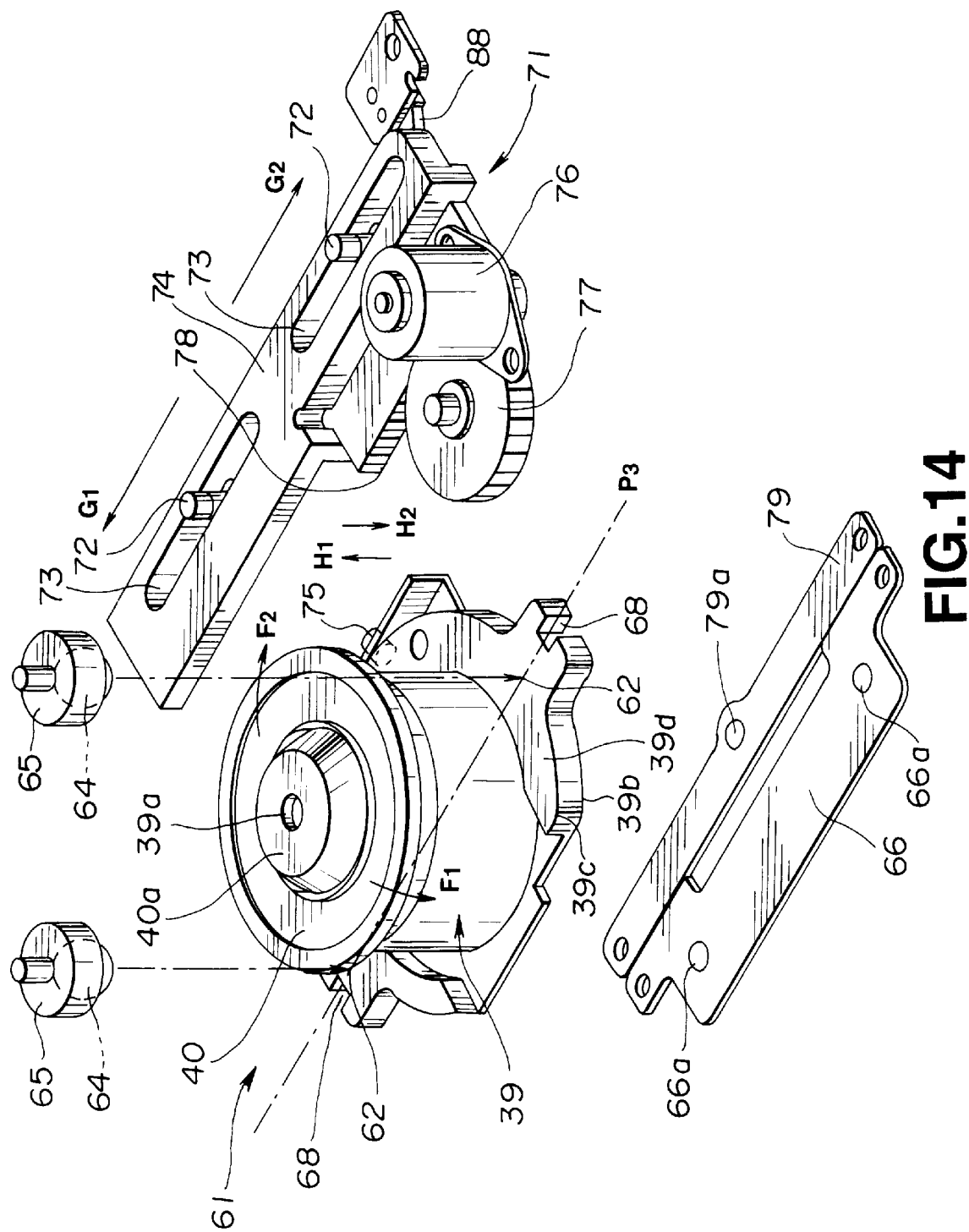
FIG. 14 is an exploded perspective view showing the skew control mechanism.

A first spring plate 66, operating as pressure securing means, is arranged horizontally below a base plate 39b of the spindle motor 39 in parallel with the reference line $P_3$, with left and right ends of the first spring plate 66 being secured from below by right set screws 67 on the lower surface of the lift frame 16, as shown in FIGS. 10 and 14. Directly below the left and right balls 64 are formed left and right protrusions 66a formed by drawing on the spring plate 66, as shown in FIG. 14. These protrusions 66a strongly thrust a horizontal surface 39c of a base plate 39b of the spindle motor 39, as shown in FIG. 10, for strongly thrusting two points of the reference line $P_3$ on left and right sides of a horizontal reference surface 39d formed by the upper surface of the base plate 39b from below against the left and right balls 64.

On left and right sides of the base plate 39d of the spindle motor 39 are formed left and right guide grooves 68 extending along the reference line $P_3$, as shown in FIG. 14, for facing the lift frame 16 in a horizontal state on both lateral sides of the opening 63, with left and right guide pins 69 being loosely fitted in these left and right guide grooves 66.

Thus the spindle motor 39, controlled in movement in the directions indicated by arrows $A_1$ and $A_2$ and in the left-and-right direction perpendicular to the directions indicated by arrows $A_1$ and $A_2$ in FIG. 9 relative to the lift frame 16 by the left and right guide pins 69, is mounted for rotation in directions indicated by arrows $F_1$ and $F_2$ in FIG. 9 relative to the lift frame 16 about the left and right rotational pivot points 62 as the center of rotation.

Figure 15:
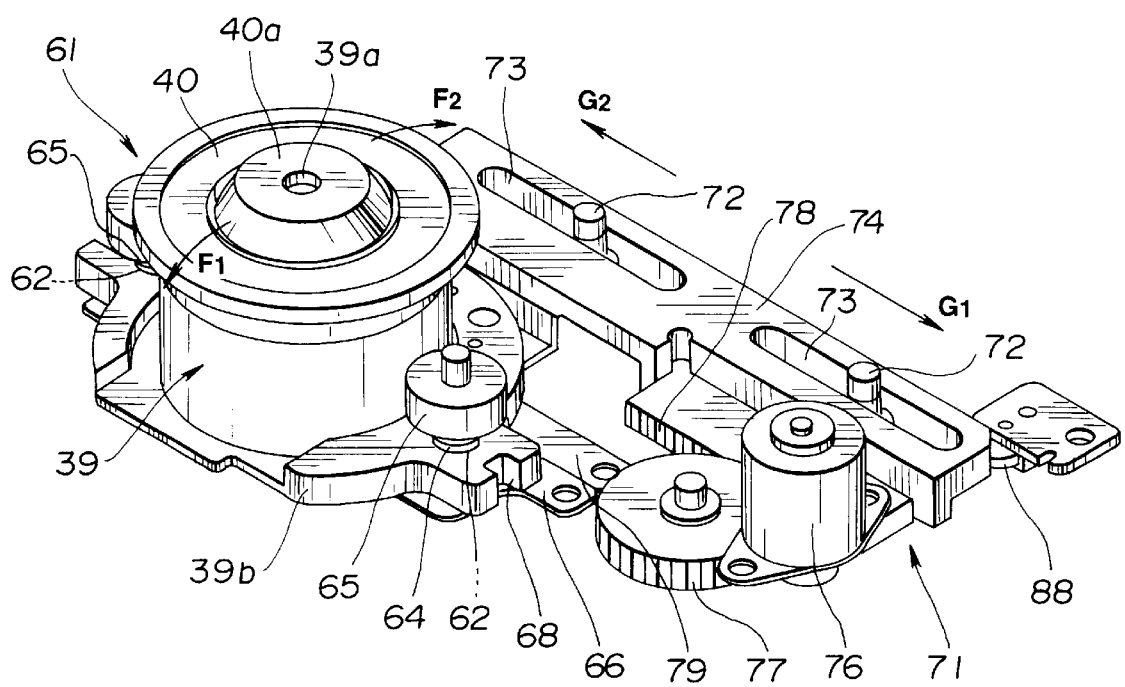
FIG. 15 is a perspective view showing the skew control mechanism.

Referring to FIG. 10, a skew driving mechanism 71 in the skew control mechanism 61 has a slide cam 74, mounted horizontally on the lower surface of the lift frame 16 and slid parallel to the reference line $P_3$ under guidance by plural guide pins 72 and guide through-holes 73, and a cam follower roll 75, as a cam follower, horizontally mounted on the base plate 39b of the spindle motor 39 so as to be pressed against a slide cam 74, as shown in FIGS. 14 and 15. The skew driving mechanism 71 also includes a skew motor 76 mounted on the lift frame 16, and a pinion gear rotationally driven by the skew motor 76 in both the forward and reverse directions. The skew driving mechanism further includes a rack gear 78 formed as one with the slide cam 74 for being linearly driven in directions indicated by arrows $G_1$ and $G_2$ in FIGS. 11 and 14, and a second spring plate 79 as pressuring means for horizontally pressuring the cam follower roll 75 from below against the slide cam 74.

The second spring plate 79 is arranged parallel to the first spring plate 66, with left and right lateral sides ends of the second spring plate 79 being secured by left and right set screws 80 to the lower surface of the lift frame 16, as shown in FIG. 9. At a mid portion of the second spring plate 79 is formed an upwardly directed protrusion 79a by drawing. The second spring plate 79 thrusts the cam follower roll 75 strongly against the slide cam 74 from below by the protrusion 79a strongly thrusting the vicinity of the cam follower roll 75 from below by the lower surface 39c of the base plate 39b of the spindle motor 39, as shown in FIG. 9.

Figure 12:
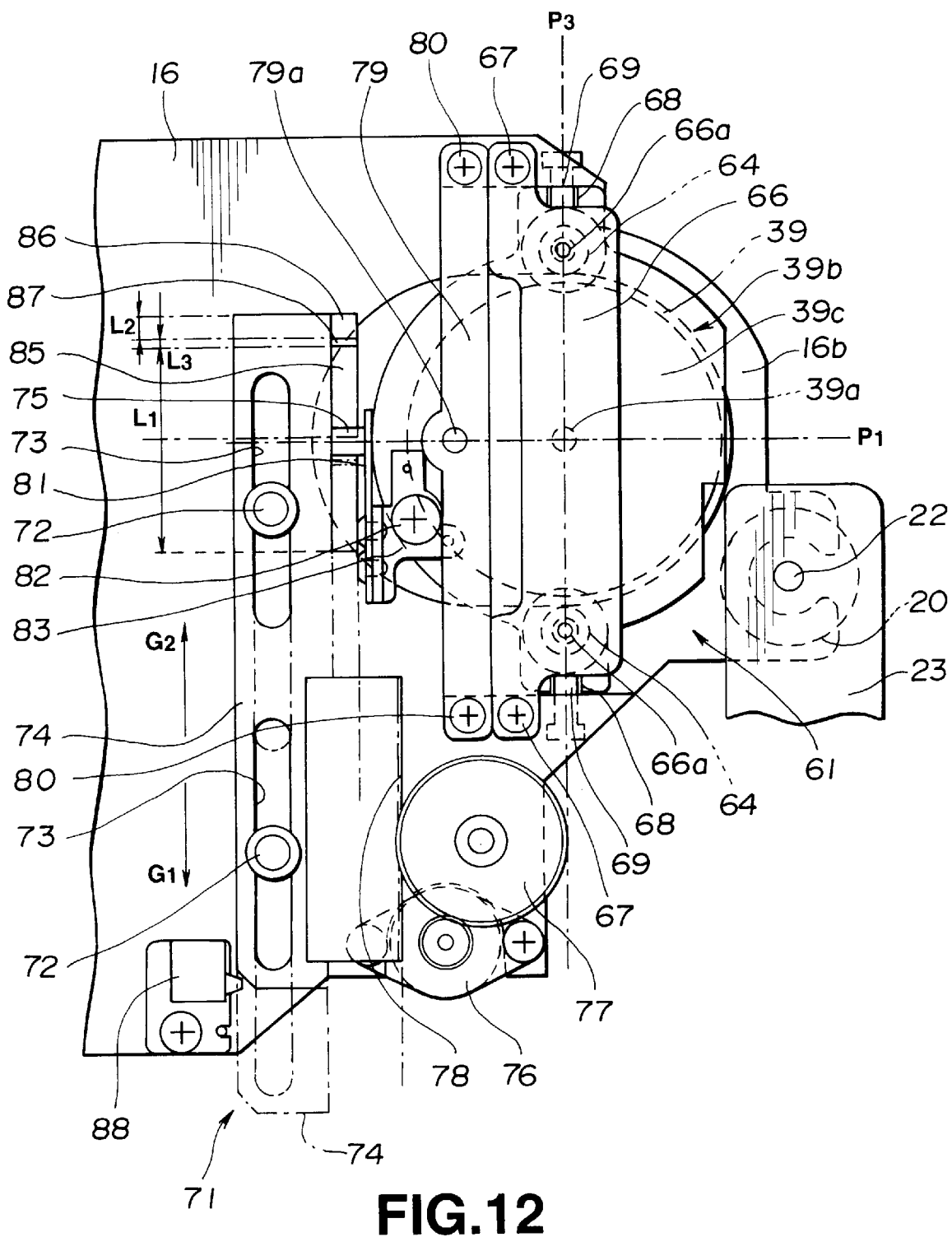
FIG. 12 is a bottom view showing the skew control mechanism.

The cam follower roll 75 is rotatably mounted on a height adjustment plate 81, as shown in FIGS. 9 and 12. This height adjustment plate 81 is secured to the base plate 39b by a set screw 82 for being mounted for height adjustment on a mounting plate 83, as shown in FIG. 12.

Figure 13:
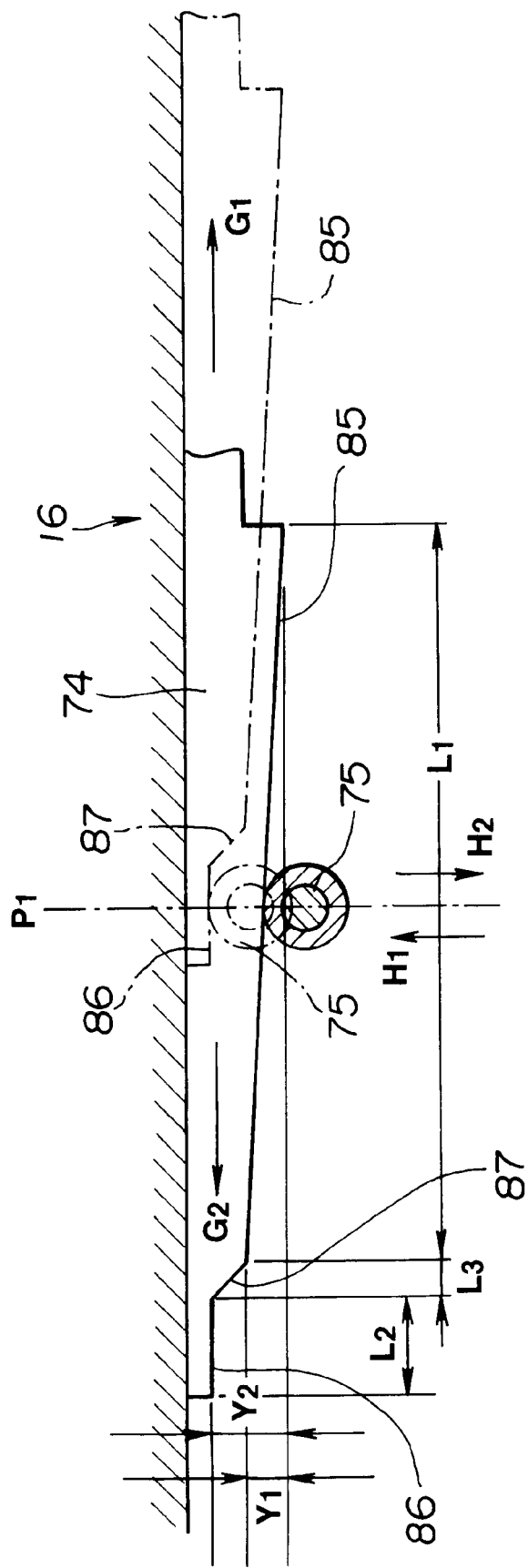
FIG. 13 is an enlarged side view showing a slide cam of the skew control mechanism.

Referring to FIG. 13, the slide cam 74 has a skew controlling cam surface 85 of a length $L_1$, smoothly sloped along the direction of arrows $G_1$ and $G_2$, representing its slide direction, and a working distance enlargement cam surface 86, which is a horizontal raised portion of a length $L_2$ formed on an end of the skew controlling cam surface 85 in a direction indicated by arrow $G_1$. The slide cam 74 also includes an inclined surface 87 interconnecting the skew controlling cam surface 85 and the working distance enlargement cam surface 86. A step difference $Y_1$ is formed between the skew controlling cam surface 85 and the working distance enlargement cam surface 86 for forming a step difference $Y_2$ for the skew controlling cam surface 85.

A skew initial position sensor 88 for detecting whether or not the current position is the skew initial position depending on the sliding position of the slide cam 74 is mounted by a set screw 89 on the lower surface of the lift frame 16, as shown in FIG. 12.

Explanation of the Skew Control Operation

The skew control operation by the above-described skew control mechanism 61 is carried out with the high-density second optical disc 1b loaded on the present optical disc drive device, as will be explained later. That is, the skew control operation occurs when the second optical disc 1b is clamped by the disc clamper 53 on the disc table 40 and rotationally driven by the spindle motor 39, as shown in FIGS. 9 and 10.

When the spindle motor 39 is driven under this playback mode for rotationally driving the second optical disc 1b, the tilt of the second optical disc 1b with respect to the objective lens 42 is sensed by the light reflection type skew sensor 43.

The skew control mechanism 61 controls the tilt of the optical disc 1 relative to the objective lens 42 so that the optical axis $F_0$ of the light beam radiated by the objective lens 42 on the optical disc 1 will be perpendicular (90°) to the optical disc 1.

That is, the pinion gear 77, rotationally driven in the forward and reverse directions by the skew motor 76 of the skew driving mechanism 71, drives the rack gear 78 on the basis of a detection output of the skew sensor 43 for adjusting the sliding of the slide cam 74 in directions indicated by arrows $G_1$ or $G_2$ of FIGS. 12 and 15.

This causes the skew adjustment cam 85 of the slide cam 74 to lift or lower the cam follower roll 75 with a minor stroke in directions indicated by arrows $H_1$ or $H_2$ in FIG. 9 corresponding to the vertical direction, for adjusting the tilt of the spindle motor 39 in directions indicated by arrows $F_1$ or $F_2$ n FIG. 9 about the left and right rotational pivot points 62 as center.

The second optical disc 1b, horizontally clamped on the disc table 40, is tilt-adjusted in directions imitated by arrows $I_1$ and $I_2$ relative to the horizontal reference plane $P_{11}$, corresponding to the vertical direction, as shown in FIG. 9.

By this tilt adjustment of the second optical disc 1b, the optical disc 1 is radial skew controlled so that the optical disc 1 will become perpendicular (90°) relative to the optical axis $F_0$ of the light beam from the objective lens 42.

Specifically, if, based on the detection output from the skew sensor 43, the second objective lens 1b is tilted relative to the objective lens 42 in the direction indicated by arrow $I_1$ corresponding to the (+) direction relative to the horizontal reference plane $P_{11}$ as shown by a chain dotted line in FIG. 9, the radial skew control operation is carried out so that the tilt of the second optical disc 1b will be corrected in a direction indicated by arrow $I_2$ corresponding to the (−) direction relative to the horizontal reference plane $P_{11}$. Conversely, if the second objective lens 1b is tilted relative to the objective lens 42 in the direction indicated by arrow $I_2$ corresponding to the (−) direction relative to the horizontal reference plane $P_{11}$ as shown by a double-dotted chain line in FIG. 9, the radial skew control operation is carried out so that the tilt of the second optical disc 1b will be corrected in a direction indicated by arrow $I_1$ corresponding to the (+) direction relative to the horizontal reference plane $P_{11}$.

The result is that data reproduction is carried out with the second optical disc 1b being maintained at all times at a perpendicular position (90°) relative to the optical axis $F_0$ of the objective lens 42, thus enabling high-density high-precision data reproduction.

The above-described skew control mechanism 61, in which radial skew control of the second optical disc 1b in the directions indicated by arrows $I_1$ or $I_2$ is performed by tilt adjustment of the spindle motor 39 in the directions indicated by arrows $F_1$ or $F_2$ in FIG. 9, is simpler in structure and consumes less power than a conventional mechanism in which optical pickup 41 in its entirety is controlled in tilt, thus realizing a small-sized low-cost optical disc drive device 5 of the power saving type.

In addition, the skew control mechanism 61, in which left and right side points of the reference plane 39d of the base plate 39b of the spindle motor 39 are pressured from below by the spring plate 66 against the left and right balls 64 constituting left and right rotational pivot points 62 for tilt adjustment of the spindle motor 39 in directions indicated by arrows $F_1$ or $F_2$ in FIG. 9 about the left and right rotational pivot points 62 as center, can smoothly perform tilt adjustment of the second optical disc 1b in directions indicated by arrows $I_1$ and $I_2$ relative to the objective lens 42. In addition, since only small power is required for controlling the tilt of the spindle motor 39 in the directions indicated by arrows $F_1$ and $F_2$ in FIG. 9, the skew motor 76 may be reduced in size, thus reducing the space and realizing saving in power consumption.

Moreover, the skew control mechanism 61 is constructed so that the slide cam 74 is slid by the slide motor 76 in directions indicated by arrows $G_1$ or $G_2$ in FIG. 15, and the cam follower roll 75 is lifted or lowered in directions $H_1$ and $H_2$ in FIG. 13 corresponding to the vertical direction by the skew control cam surface 85 of the slide cam 74 for adjusting the angle of the spindle motor 39 in the directions $F_1$ or $F_2$ in FIG. 9, so that an extremely small driving power suffices for sliding driving of the slide cam 75, thus enabling reduction in space and saving in power consumption otherwise brought about by the reduction in size of the skew motor 76.

Furthermore, since the optical disc driving device has the disc tray 2 for loading and ejecting the optical disc 1 and the lift frame 16 lifted and lowered within the main body portion 5 in the directions indicated by arrows $C_1$ and $C_2$ in FIGS. 8 and 9, and the lift frame 16 is fitted with the spindle motor 39, optical pickup 41 and the skew control mechanism 61, the second optical disc 1b can be controlled for tilt relative to the objective lens 42 in the disc tray type disc driving device.

Structure of the Rotational Pivots in the Skew Control Mechanism

Figure 16:
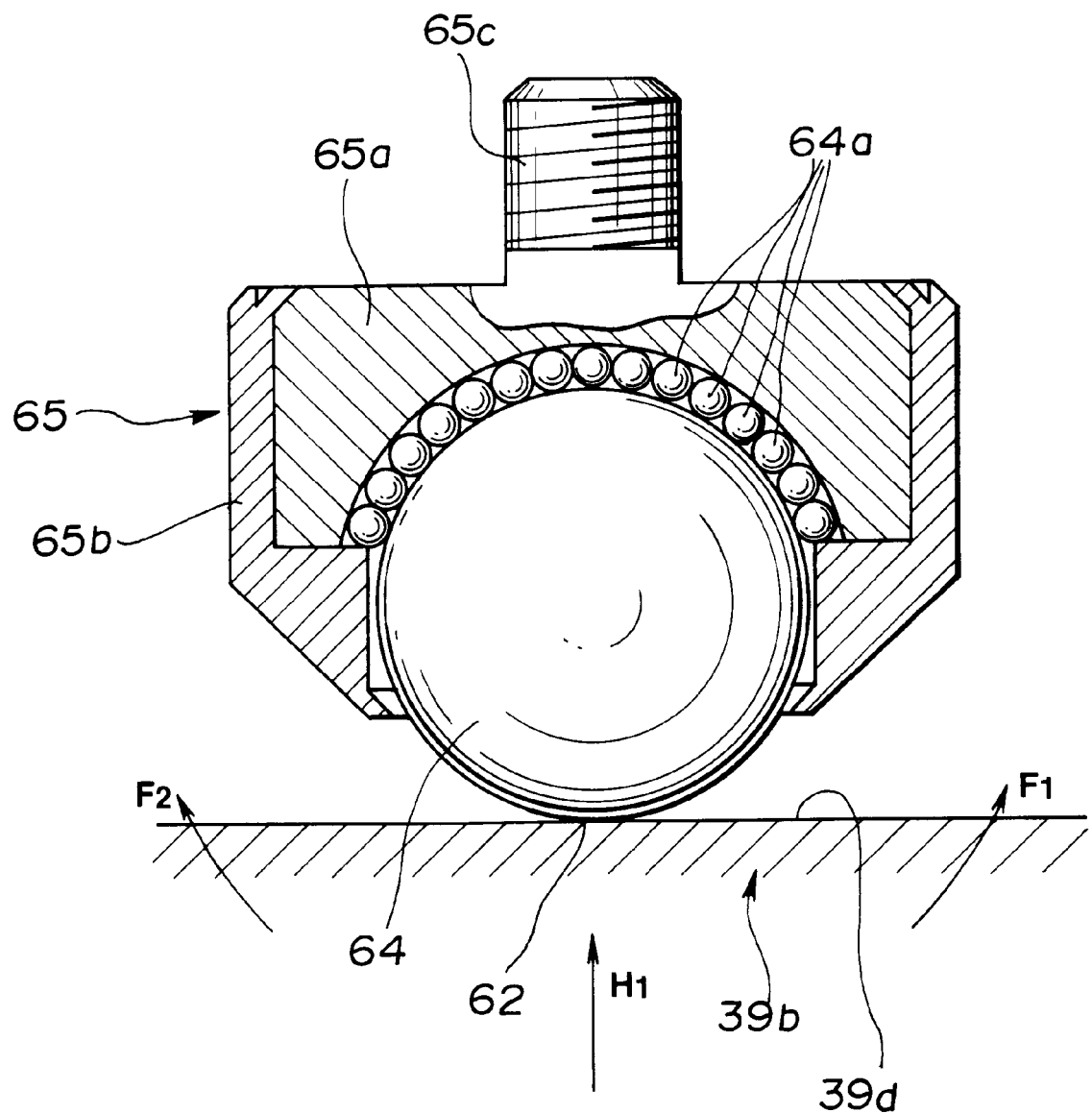
FIG. 16 is a side cross-sectional view showing a rotational fulcrum point constituting the skew control mechanism.

An illustrative structure of the rotational pivot constituting the skew control mechanism 61 is hereinafter explained. The rotational pivot includes the ball holder 65 comprised of a main body member 65a, a cap 65b, a large-sized ball 64 approximately 5 mm in diameter rotatably mounted on the lower end of the ball holder 65, and about 100 ultra-small-sized balls 64a about 0.5 mm in diameter on the inner upper side of the large-sized ball 64, as shown in FIG. 16.

The ball holder 65 is screwed from below to the lift frame 16 shown in FIG. 10 by a screw 65c formed as one with the upper mid portion of the main body member 65a, as shown in FIG. 10, so that the reference surface 39d of the motor base 39b of the spindle motor 39 secured under pressure from the direction indicated by arrow $H_1$ in FIG. 10 is received by the rotational pivot 62 constituting the apex point of the large-sized ball 64 for performing tilt control of the spindle motor 39 in the directions indicated by arrows $F_1$ or $F_2$ in FIG. 16 about the rotational pivot 62 as center.

Therefore, with the above-described rotational pivot, the large-sized ball 64 can be rotated in stability with low friction by the ball-bearing function assured by about 100 ultra-small sized balls 64a, thus assuring smooth high-precision radial skew adjustment as described above.

Figures 17A, 17B, 17C:
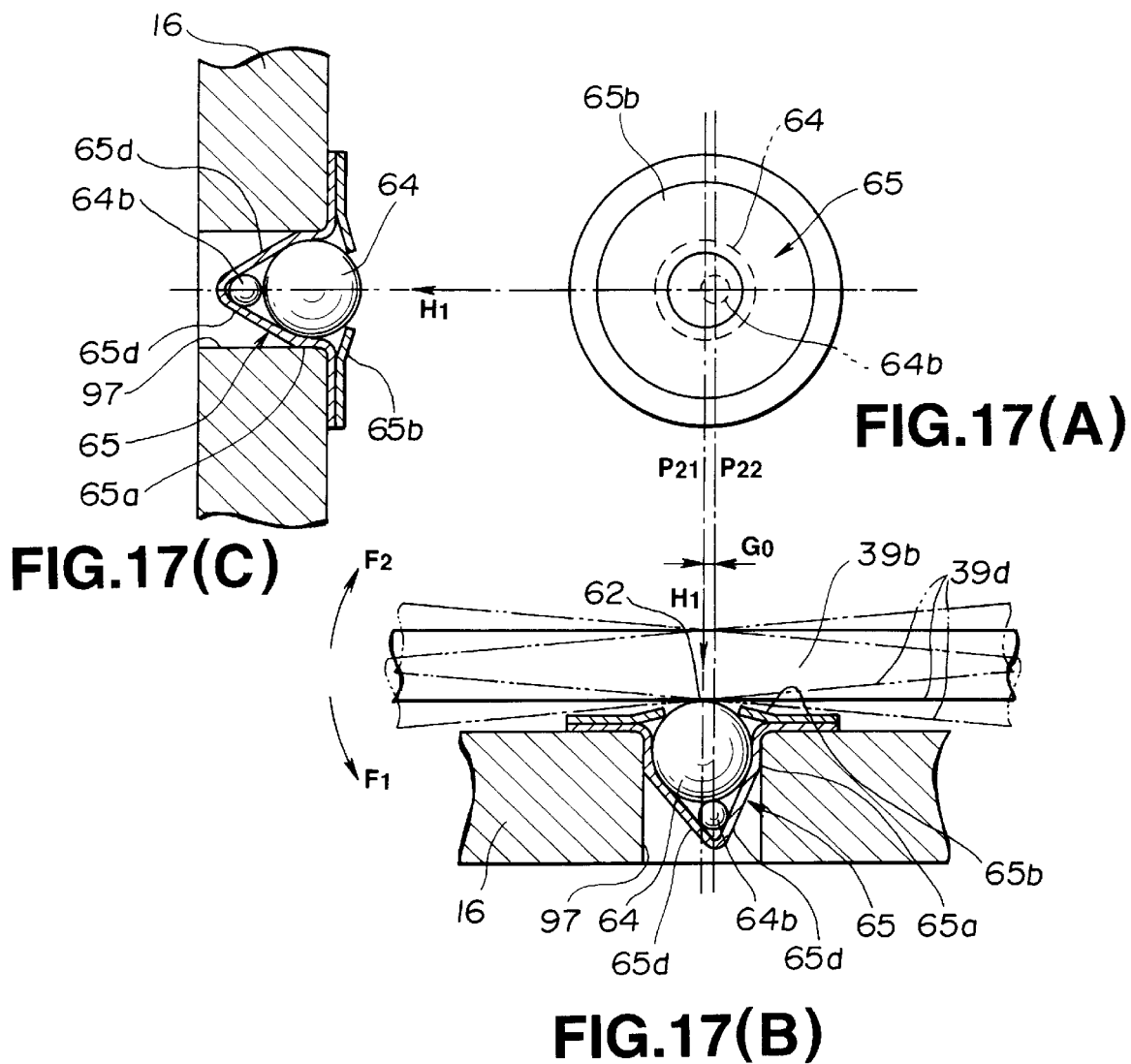
FIGS. 17a–17c are side cross-sectional view showing another embodiment of the rotational fulcrum point.

A rotational pivot shown in FIG. 17 has a ball holder 65 of a metal sheet made up of a main body member 65a and a cap 65b, a large-sized ball 64 approximately 5 mm in diameter rotatably mounted on the lower end of the ball holder 65 and a small-sized ball 64b approximately 3 mm in diameter rotatably mounted on the lower end of the large-sized ball, with the center $P_{21}$ of the large-sized ball 64 being slightly offset at $G_0$ relative to the center $P_{22}$ of the small-sized ball. The ball holder 65 is formed with a substantially conically-shaped tapered surface 65d extending along the outer peripheral surfaces of the large-sized ball 64 and the small-sized balls 64b. Meanwhile, the contact portion of the tapered surface 65d with the small-sized ball 64b is preferably coated with a lubricant, such as molybdenum.

The ball holder 65 is mounted, such as by press fitting, within a mounting hole 97 formed in the lift frame 16 so that the reference surface 39d of the motor base 39b of the spindle motor 39 press-fitted from the direction shown by arrow h for tilt-adjusting the spindle motor 39 in the directions indicated by arrows $F_1$ or $F_2$ in FIG. 17 about the rotational pivot as center.

Thus, with the present rotational pivot mechanism, only two balls suffice, while the ball holder 65 is made up of two components, namely the main body member 65a and the cap 65b, that may be easily fabricated from metal sheets. In addition, the ball holder 65 can be easily mounted, such as by press fitting, in the mounting hole 97 in the motor base 39b, thus simplifying the structure and production and achieving low production cost.

In addition, the large-sized ball 64 and the small-sized ball 64b can be rotated with a low friction by relative rolling, while the large-sized ball 64 and the small-sized ball 64b, offset by $G_0$ relative to each other, can be rotated in stability as the balls are thrust against the opposite sides of the tapered surface 65d of the ball holder 65 by the components of pressuring force of the base plate 39b applied to the rotational pivot point 62 from the direction shown by arrow $H_1$, so that the large-sized ball 64 and the small-sized ball 64b can be rotated in stability without vibrations. If the tapered surface 65d is coated with a lubricant, such as molybdenum, the large-sized ball 64 and the small-sized ball 64b can be rotated in stability more smoothly. Consequently, the above-described radial skew control operation can be performed smoothly with higher accuracy.

In a rotational pivot shown in FIG. 18, the small-sized ball 64b shown in FIG. 17 is replaced by a small-sized roll 64c. In other respects, the structure of FIG. 18 is the same as that shown in FIG. 17. Therefore, the rotational pivot shown in FIG. 18 gives the structure and effect equivalent to those of the rotational pivot shown in FIG. 17.

However, the main body member 65a of the ball holder 65 of a metal sheet constituting the rotational pivot shown in FIG. 18 has a substantially vee-shaped groove-like tapered surfaces 65d on both sides in the direction of the offset $G_0$ between the large-sized ball 64 and the small-sized ball 64b, while the tapered surface 65d is not formed in a direction perpendicular to the direction of offset $G_0$ of the main body member 65a. In this case, it is similarly preferred to apply a lubricant, such as molybdenum, on at least the contact portion of the tapered surface 65d with the small-sized roll 64c.

Working Distance

If the optical disc drive device of the instant embodiment is set to the playback mode as described above, the cam follower roll 75 is lifted or lowered in the direction indicated by arrows $H_1$ or $H_2$ by the skew controlling cam surface 85 of the slide cam 74 of the skew control mechanism 61, as shown by a solid line in FIG. 13, for controlling the tilt of the spindle motor 39 for controlling the tilt of the first optical disc 1a or the second optical disc 1b loaded on the spindle motor 40 by way of performing radial skew control.

Thus, in the playback mode, a working distance WD1 between the major surface of the first optical disc 1a or the second optical disc 1b loaded on the disc table 40 and the upper surface of the objective lens 42 may be reduced significantly up to approximately 1.2 mm, as shown in FIG. 9.

Control of Working Distance

When the slide cam 74, shown in FIG. 13, constituting the above-described skew control mechanism 61, is slid by the skew motor 76 from the radial skew operating position shown by a solid line in FIG. 13 to the initial position shown by a chain-dotted line in FIG. 13, the cam follower roll 75 rides from the skew controlling cam surface 85 on the inclined surface 87 of the slide cam 74 so as to be lifted up to the working distance enlargement cam surface 86 in a direction indicated by arrow $H_1$ therein.

The spindle motor 39 is the rotated up to the initial position indicated by arrow $F_1$ in FIG. 9 so that the optical disc 1a or the second optical disc 1b loaded on the disc table 40 is lifted up to the initial position $P_{12}$ indicated by a chain-dotted line in FIG. 9 in the direction indicated by arrow $I_1$ in FIG. 9. This reduces the working distance between the optical disc 1a or the second optical disc 1b and the objective lens 42 from a small value $WD_1$ of approximately 1.2 mm for the playback mode to a larger value $WD_2$ of approximately 2.0 mm which is of the same size as that in the conventional optical disc driving device.

Figure 19:
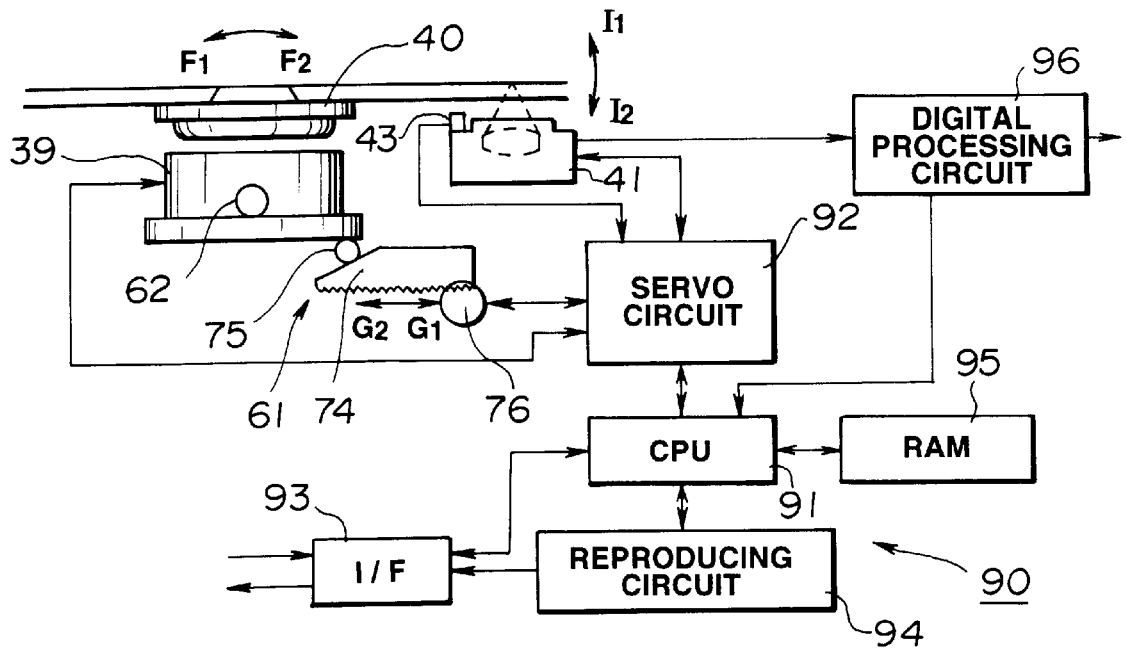
FIG. 19 is a block diagram showing a control circuit section of the optical disc driving device.

The optical disc driving device of the instant embodiment has a control circuit 90 constructed as shown in FIG. 19. This control circuit 90 controls the rotation of the spindle motor 39 by a servo circuit 92 controlled by a CPU 91 having a micro-computer, while controlling the reproduction of the optical disc 1a or the second optical disc 1b by the optical pickup 41 and controlling the rotation of the skew motor 76 of the skew control mechanism 61. The input/output signal from the control circuit 90 to the CPU 91 or the output signal of the playback signals from a playback circuit 94 is temporarily stored in a RAM circuit 95 and is exchanged via an external interface 93 with the host computer connected to the present optical disc driving device.

The control circuit 90 operates so that, when the optical disc driving device is set to the playback mode, the working distance, which is the relative distance between the optical disc 1a or the second optical disc 1b and the optical pickup device 42 shown in FIG. 9, is reduced to is small value of $WD_1$ of approximately 1.2 mm, and so that, on power down, this working distance is automatically increased to a larger value $WD_2$ of approximately 2.0 mm.

Figure 20:
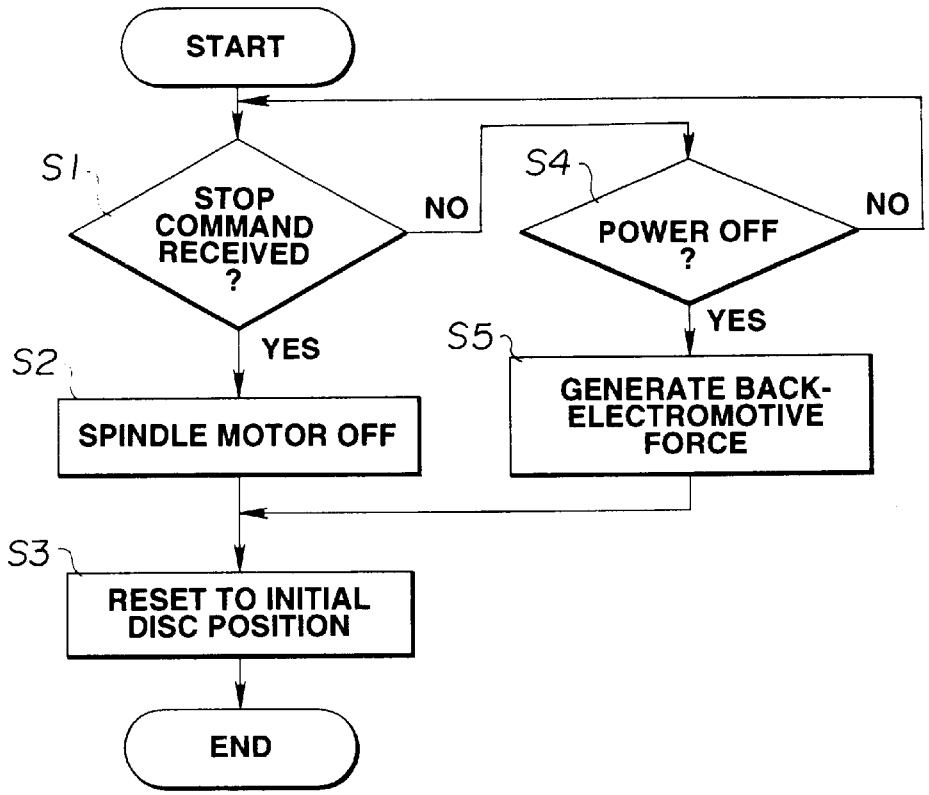
FIG. 20 is a flowchart showing the operation of a working distance of the optical disc drive device.

Thus, referring to the flowchart of FIG. 20, if the optical disc driving device is set to the playback mode, it is judged by the CPU 91 at step S1 whether or not a stop command has been received via external interface 93 from the host computer. If at step S1, the stop command has been received, the CPU 91 causes the spindle motor 1 to be halted at step S2. At the next step S3, contiguous to the stop of the spindle motor 39, the CPU controls the servo circuit 92 in order to cause the skew motor 76 to be driven to slide the slide cam 74 in the direction shown by arrow $G_1$ up to the initial position shown by a chain-dotted line in FIG. 9 in order to lift the first optical disc 1a or the second optical disc 1b to the initial position $P_{12}$ shown by the chain-dotted line in FIG. 9 in a direction shown by arrow $I_1$ in FIG. 9.

If the optical disc driving device is set to the playback mode, and if the power is turned off in the absence of the stop command from the host computer, such as by power supply interruption, with the first optical disc 1a or the second optical disc 1b being in the course of reproduction, the skew motor 76 is driven by exploiting the counter-electromotive force of the spindle motor 39 at step 5 for sliding the slide cam 74 in a direction indicated by arrow $G_1$ to the initial position shown by the chain-dotted line in FIG. 13 for lifting the first optical disc 1a or the second optical disc 1b to the initial position $P_{12}$ shown by the chain-dotted line in FIG. 9.

The above-mentioned working distance enlarging operation is similarly carried out when the power source is turned on in the playback mode but the operation of reproducing the first optical disc 1a or the second optical disc 1b by the optical pickup 41 is not going on or if the power source is suddenly turned off such as by power supply interruption when the first optical disc 1a or the second optical disc 1b is being loaded on the disc table 40.

In the former case, the skew motor 76 is run in rotation for sliding the slide cam 74 in a direction indicated by arrow $G_1$ to the initial position shown by a chain-dotted line in FIG. 13. In the latter case, the skew motor 76 is driven by the counter-electromotive force of the spindle motor 39 for sliding the slide cam 74 in a direction indicated by arrow $G_1$ to the initial position shown by a chain-dotted line in FIG. 13 for lifting the first optical disc 1a or the second optical disc 1b in a direction indicated by arrow $I_1$ to the initial position shown by the chain-dotted line in FIG. 13.

By the above-described arrangement in which the working distance is reduced in the playback mode to a small value $WD_1$ for the playback mode and increased to a larger value $WD_2$ on power down, there is no risk of the first optical disc 1a or the second optical disc 1b loaded on the disc table 40 being collided against the objective lens 42 even if the optical disc driving device is subjected to an excessive external shock, resulting in significantly improved impact resistance.

Moreover, since the working distance $WD_2$ may be reduced for the playback mode from approximately 2.0 mm for the conventional optical disc driving device to approximately 1.2 mm, thus enabling the device itself to be reduced in thickness.

By controlling the sole skew control mechanism 61 by the control circuit 90 constituting the control means of the optical disc driving device of the instant embodiment, for controlling the radial skew of the first optical disc 1a or the second optical disc 1b on the disc table 40 with respect to the objective lens 42 and for moving the first optical disc 1a or the second optical disc 1b to the initial position $P_{12}$ for enlarging the working distance from the small value $WD_1$ to the larger value $WD_2$, the sole skew control mechanism 61 can be used simultaneously for radial skew control and for enlarging the working distance for simplifying the structure and reducing the cost.

Since the operation of controlling the radial skew and the operation of enlarging the working distance can be performed by rotating the spindle motor 39 in the directions indicated by arrows $F_1$ or $F_2$ about the rotational pivot 62 as the center of rotation, the radial skew control and working distance enlarging operations can be performed easily and smoothly.

By forming the working distance enlarging cam surface 86 as one with the skew controlling cam surface 85 of the slide cam 74, the radial skew control and working distance enlarging operations can be performed by the sole slide cam 74 thus simplifying the structure and assuring a reliable operation.

Selection of the Standard Recording Density First Optical Disc and High Recording Density Optical Disc With the optical disc driving device of the instant embodiment, the first optical disc 1a of the standard recording density, with the diameter of 12 cm, such as CD or CD-ROM, or the second optical disc 1b of the high recording density, with the diameter of 12 cm, such as HD-CD or HD-CD-ROM, can be reproduced selectively.

The second optical disc 1b having the high recording density, such as HD-CD or HD-CD-ROM, is required to have high dimensional accuracy, while the first optical disc 1a of the standard recording density, such as CD or CD-ROM, is not required to have accuracy as high as that of the second optical disc 1b.

However, if radial skew control is performed by the skew control mechanism 61 of the optical disc driving device of the instant embodiment on the first optical disc 1a for which high dimensional accuracy is not required, the radial skew control range, that is the tilt control range in the direction indicated by arrow $I_1$ or $I_2$ in FIG. 9, corresponding to the up-and-down direction of the optical disc 1a or the second optical disc 1b loaded on the disc table 40 shown in FIG. 9, needs to be set to a larger value, such that it becomes necessary to set a larger spacing in the direction of thickness of the main body portion 5 in which to perform radial skew control. In addition, the length in the sliding direction of the slide cam 74 in the skew control mechanism 61, that is the length in the directions indicated by arrows $G_1$ or $G_2$ in FIG. 13, needs to be increased, thus increasing the size of the skew control mechanism 61 itself.

The result is that, if it is desired to perform radial skew of the first optical disc for which high dimensional accuracy is not required, it is necessary to increase the thickness of the main body portion of the disc driving device itself, thus inevitably increasing the size of the disc driving device itself.

With this in view, the present optical disc driving device is arranged so that, for selectively reproducing the first optical disc 1a for which high dimensional accuracy is not required or the second optical disc 1b for which high dimensional accuracy is required, these two disc types, that is the optical disc 1a or the second optical disc 1b, are discriminated, and radial skew control is halted when the first optical disc 1a is loaded, while the radial skew control is performed only when the first optical disc 1a is loaded, for realization of the reduced thickness of the disc driving device itself.

Figure 21:
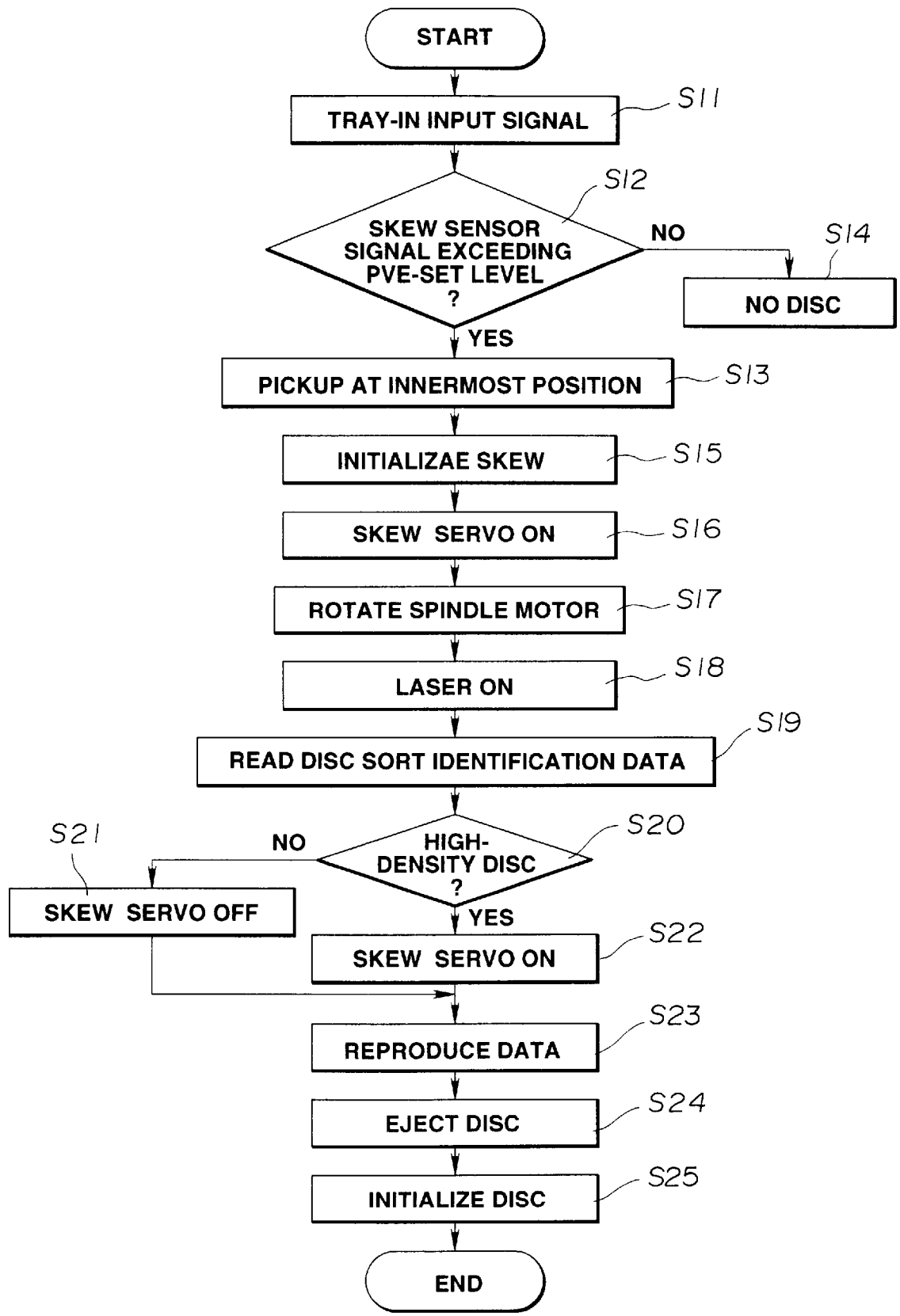
FIG. 21 is a flowchart for illustrating the control operation of the optical disc device.

This operation is hereinafter explained by referring to the block diagram of the optical disc driving device shown in FIG. 9 and the flowchart shown in FIG. 21.

First, the power source of the optical disc device is turned on, the optical disc 1a or the second optical disc 1b is set on the disc holder 3 of the disc tray 2 pulled out of the main body portion of the device 5, and the loading operation of moving the disc tray 2 into the inside of the main body portion 5 is carried out.

If the loading operation for the disc tray 2 is performed, the CPU 91 detects at step S11 that the disc tray 2 has been moved to the loading position, and outputs a detection signal.

When it is detected that the disc tray 2 has been loaded, then it is judged at step S12 by the CPU 91 whether the detection output of the detection signal by the skew sensor 43 is not less than a pre-set level. If the detection output of the detection signal by the skew sensor 43 is higher than the pre-set level, the carriage driving motor 48 is driven at step 13 for moving the optical pickup 41 to the innermost radial position of the first optical disc 1a or the second optical disc 1b loaded on the disc table 40.

If the detection output of the detection signal from the skew sensor 43 is not higher than a pre-set level, it is judged at step S14 that neither the first optical disc 1a nor the second optical disc 1b is loaded on the disc table 40, such that no processing operation is performed.

If, at step S13, the optical pickup 41 is moved to the innermost radial position ID of the optical disc 1a or 1b, the skew is initialized at step 15 by the servo circuit 92 based on the control signal from the CPU 91. That is, the CPU 91 performs control for moving the slide cam 74 to the skew initial position, based on the output signal from the skew initial position sensor 88 mounted on the lift frame 16, as shown in FIG. 12. The skew initial position is such a skew position in which the axis $P_2$ of the spindle motor shown in FIG. 10 is substantially a zero design value (signifying a substantially vertical position).

The control to the skew initial position is performed so that, if the skew initial position sensor 88 shown in FIG. 12 is acted upon by the slide cam 74 and thereby turned on, the slide cam 74 is slid in the direction indicated by arrow $G_2$ in FIG. 15 until the skew initial position sensor 88 is turned off, and so that, if the skew initial position sensor 88 is not acted on by the slide cam 74 and hence is turned off, the slide cam 74 is slid in the direction indicated by arrow $G_1$ in FIG. 15 until the skew initial position sensor 88 is turned on.

When the setting to the skew initial position is done, the CPU 91 turns the skew servo on at step 16. The CPU 91 then drives the spindle motor 39 at step 17 for rotationally driving the optical disc 1a or the second optical disc 1b.

The CPU 91 then turns on the semiconductor laser, as a light source of the optical pickup 41 at step 18 for radiating a light beam.

At step S19, the CPU 91 causes the disc sort identification data, recorded on the innermost radial position ID of the rotating first or second optical disc 1a, 1b, to be read out by the optical pickup 41. The disc sort identification data, read out by the optical pickup 41, is entered to a data processing circuit 96, as shown in FIG. 19, so as to be supplied thence to the CPU 91.

The CPU 91 judges at step S20, based on the disc sort identification data entered from the data processing circuit 96, whether the optical disc loaded on the disc table 40 is the first or second optical disc 1a, 1b.

If the optical disc loaded on the disc table 40 is judged to be the first optical disc 1a of standard recording density, the CPU 91 sets the skew servo at step S21 to an off state and halts the radial skew control for the optical disc 1a.

The CPU 91 reproduces data at this step forgiving judgment whether the loaded optical disc is the optical disc of standard recording density or the optical disc of high recording density.

If it is judged at step S20 that the optical disc as loaded on the disc table 40 is the second optical disc 1b with high recording density, the CPU 91 turns the skew servo on at step S22, at the same time as it causes data, signifying that the loaded optical disc is the second optical disc of high recording density 1b, to be stored in the RAM 95.

The CPU 91 then causes data in meeting with the sort of the optical disc loaded on the disc table 40 to be reproduced at step S23. If the optical disc loaded on the disc table 40 is the first optical disc 1a, data reproduction is carried out in a state in which radial skew control is inhibited.

If the optical disc loaded on the disc table 40 is the second optical disc 1b, data specifying that the loaded optical disc is the second optical disc 1b is entered to the CPU 91, such that data reproduction is carried out whilst the radial skew of the second optical disc 1b is controlled by the CPU 91.

Meanwhile, data read out by the optical pickup 41 is entered to the data processing circuit 96 where it is separated from control data or the like so as to be outputted as playback data.

When reproduction of the desired data recorded on the first optical disc 1a or the second optical disc 1b loaded on the disc table 40 comes to a close, the first optical disc 1a or the second optical disc 1b loaded on the disc table 40 is ejected at step S23.

At step S24, the CPU 91 causes the first optical disc 1a or the second optical disc 1b to be ejected. At step S25, the CPU initializes the skew control mechanism 61 to complete the playback operation.

The foregoing description of the illustrative operation is made for a case in which disc sort identification data has been recorded on the innermost radial position ID of the first optical disc 1a or the second optical disc 1b. However, even if this data is not recorded on the first optical disc 1a or the second optical disc 1b, it is possible to discriminate the disc sort by detecting the difference in reflectance due to the difference in the recording density on the signal recording surface of each disc or by detecting the focal length of the objective lens 42 for detecting the differences in the focal length.

With the optical disc driving device of the instant embodiment, the first optical disc 1a or the second optical disc 1b having different recording densities may be selectively reproduced by one and the same device.

With the present optical disc device, the optical disc of high recording density, having a small data unit area, can be reproduced by a radial skew control operation with high density and to high accuracy.

Since the radial skew control operation is not done in reproducing the first optical disc 1a of standard recording density for which high dimensional accuracy is not required, the driving device itself may be reduced in thickness.

With the present optical disc driving device, in which the innermost radial position ID loaded on the disc table 40 is read out by the optical pickup 41 for discriminating whether the loaded optical disc is the first optical disc 1a or the second optical disc 1b, there is no necessity of using special means for discriminating the sort of the optical disc sort, thus simplifying the structure and reducing the cost.

Referring to the drawings, an optical disc device according to a second embodiment of the present invention will be explained in detail.

With the optical disc driving device of the instant embodiment, a first optical disc of a standard recording density, with a diameter of 12 cm, such as CD or CD-ROM, or a second optical disc of a high recording density, with a diameter of 12 cm, such as HD-CD or HD-CD-ROM, can be reproduced selectively.

Schematics of Optical Disc Driving Device

The outline of the optical disc driving device of the instant embodiment is first explained.

Figure 22:
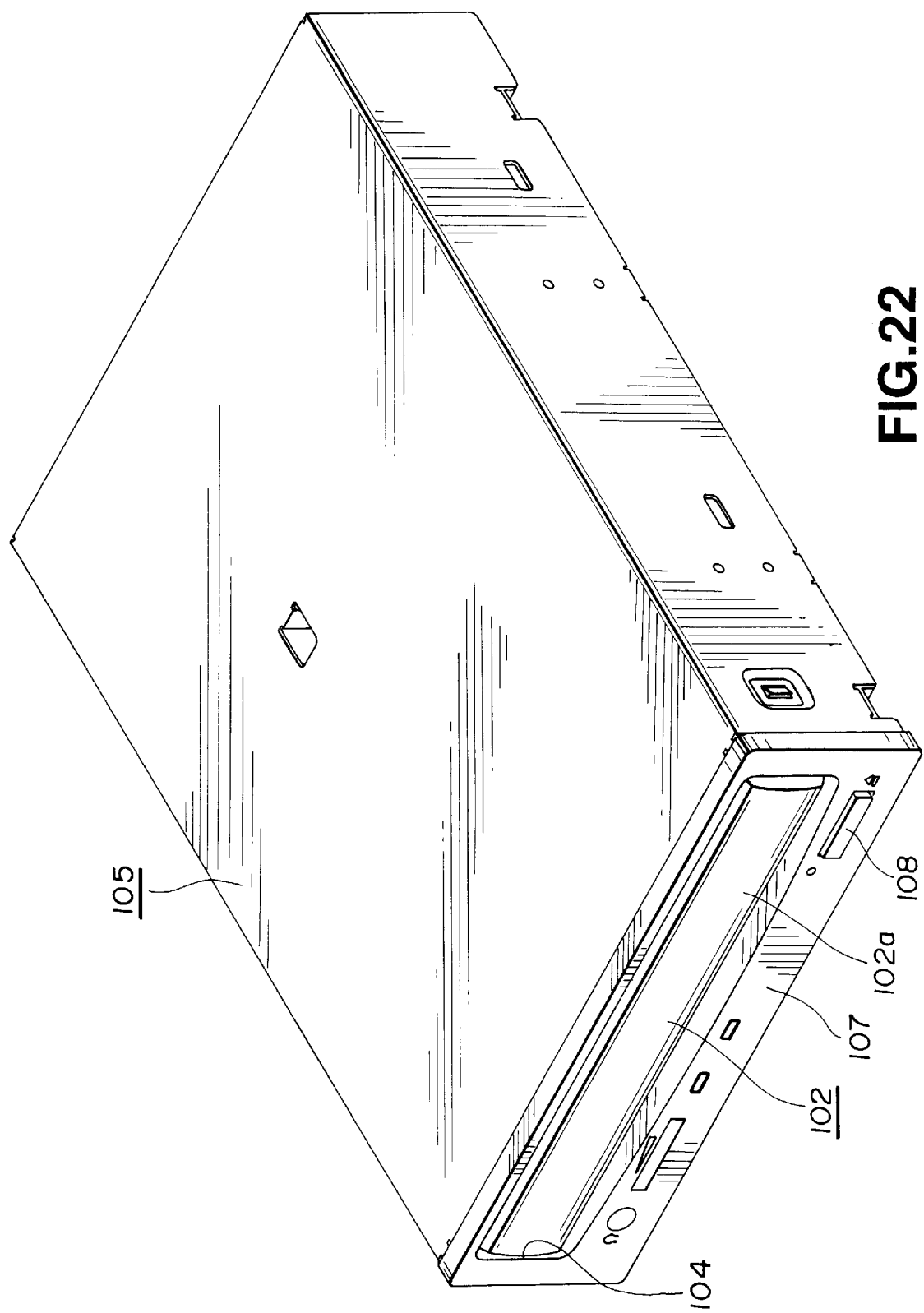
FIG. 22 is a perspective view showing the appearance of an optical disc device of a second embodiment according to the present invention.
Figure 23:
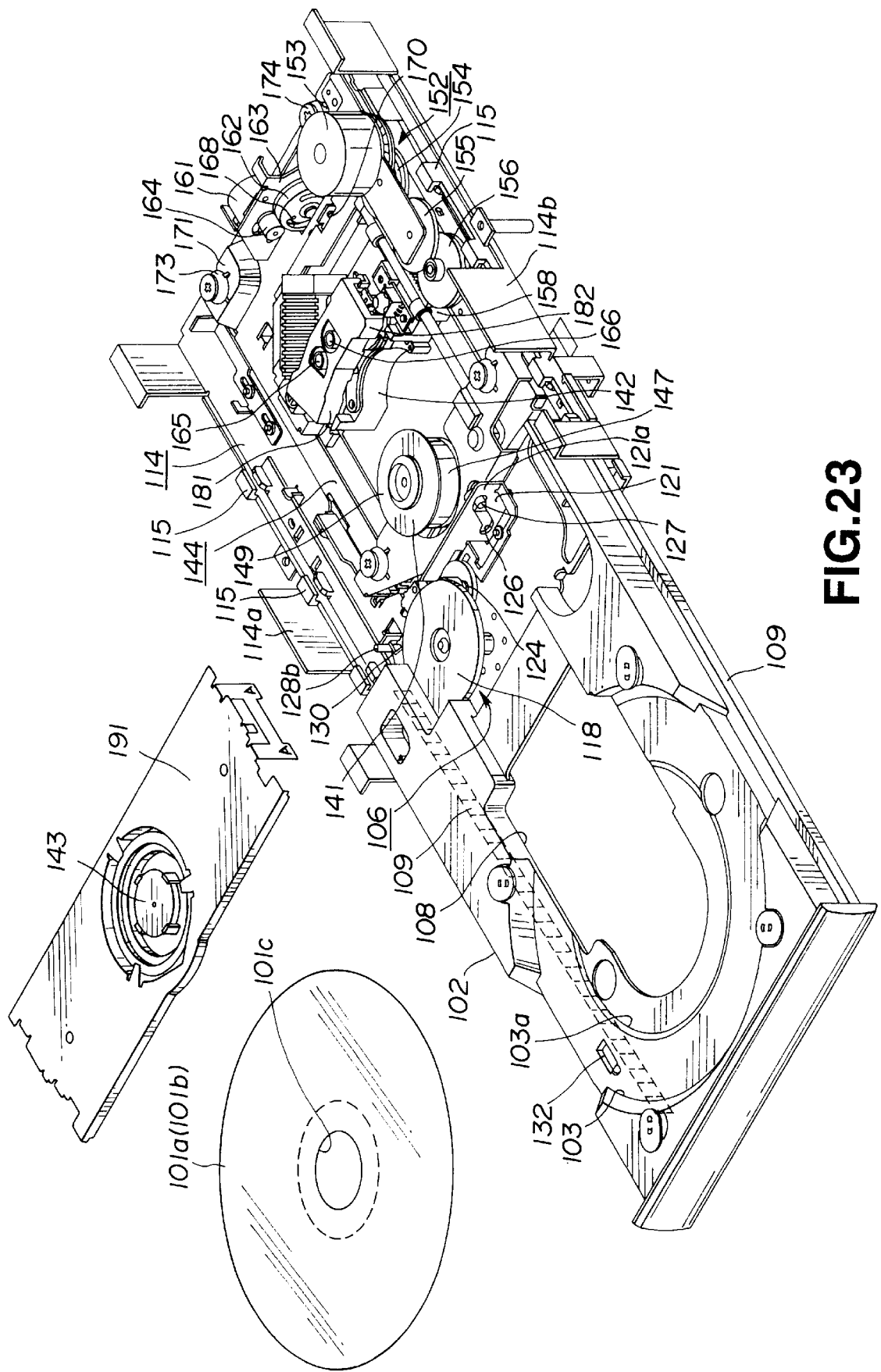
FIG. 23 is a perspective view showing a disc tray and a disc driving device.

The present optical disc device includes a disc tray 102 moved horizontally across the inner side and the outer side of a main body portion 105 of the device, as shown in FIGS. 22 and 23. This disc tray 102 has a dished disc holder 103. The first optical disc 1a or the second optical disc 1b, reproduced by the present disc driving device, is accommodated so as to be set on the bottom surface of the disc holder 103. When the disc tray 102 has been pulled out of the main body portion 105 of the device, the disc holder 103 faces the outside of the main body portion 105 of the device for enabling loading/unloading of the first or second optical disc 101a, 101b, as shown in FIG. 23.

For loading the first or second optical disc 101a, 101b, the disc tray 102 is pulled out of the main body portion 105 of the device, as shown in FIG. 23, and the first or second optical disc 101a, 101b desired to be reproduced is set on the disc holder 103. When a front side 102a of the disc tray 102 pulled out of the main body portion 105 of the device is thrust towards the inside of the main body portion 105 of the device, the disc tray 103 acts upon a loading switch, not shown, provided within the main body portion 105 of the device. If the loading switch is acted upon, the disc tray 102 is horizontally pulled into the inside of the main body portion 105 of the device by a loading driving mechanism 106 via a tray inlet/outlet 104 formed in the front panel 107 of the main body portion 105 of the device. When the disc tray 102 is fully accommodated within the main body portion 105, as shown in FIG. 21, the first or second optical disc 101a, 101b, held by the disc holder 3, is automatically loaded horizontally on the disc table, run in rotation by the spindle motor, as will be explained subsequently.

If, after loading of the first or second optical disc 101a, 101b, a playback command signal is inputted from the host computer, the spindle motor is stated to be driven for running the first or second optical disc 101a, 101b set on the disc table at a CLV (constant linear velocity) or CAV (constant angular velocity). Simultaneously with start of the rotation of the first or second optical disc 101a, 101b, the optical pickup starts its operation. The optical pickup scans the signal recording area of the first or second optical disc 101a, 101b by a light beam radiated from a light source, such as a semiconductor laser, for reading out data recorded on the first or second optical disc 101a, 101b.

If, after desired data recorded on the first or second optical disc 101a, 101b is reproduced, an ejection command signal is inputted from the host computer, or an ejection button provided on the front panel 10 is thrust, the disc movement operating mechanism is actuated for moving the disc tray 102 in the ejecting direction proceeding from the tray inlet/output 104 towards the outside of the main body portion 105 of the device. This ejection operation comes to a close when the disc holder 103 has been pulled out of the main body portion of the device 105, as shown in FIG. 23.

Disc Tray and Loading Driving Mechanism

The disc tray 102 and the loading driving mechanism 106 for the disc tray 102 for moving the disc tray 102 across the inner side and the outer side of the main body portion 105 of the device will be hereinafter explained. The disc tray 102, moved across the inner side and the outer side of the main body portion 105, is molded from a synthetic resin material and has an elongated bottom opening 108 extending from the mid portion of the disc holder 103 towards the rear end thereof disposed on the inner side of the main body portion 105, as shown in FIG. 23. When the disc tray 102 is moved to the playback position within the main body portion 105, the bottom opening 108 is faced by a disc table and an optical pickup making up the disc driving unit.

On opposite lateral sides of the disc tray 102 parallel to its movement direction are formed left and right side guide rails 109. On a bottom side lateral surface of the disc tray 102 is formed a rack gear 108 meshing with a feed gear 110 of the loading driving mechanism 106.

Within the main body portion 105 is arranged a chassis 114 formed by punching and warping a thin metallic sheet. The disc tray 102 has its left and right side guide rails 109 supported by plural tray guides 115 of synthetic resin formed on the inner sides of left and right facing side plates 114a, 114b of the chassis 114, as shown in FIG. 14, so that the disc tray is moved across the inside an the outside of the main body portion 105 by being guided by these tray guides 115, as shown in FIG. 23.

Figure 24:
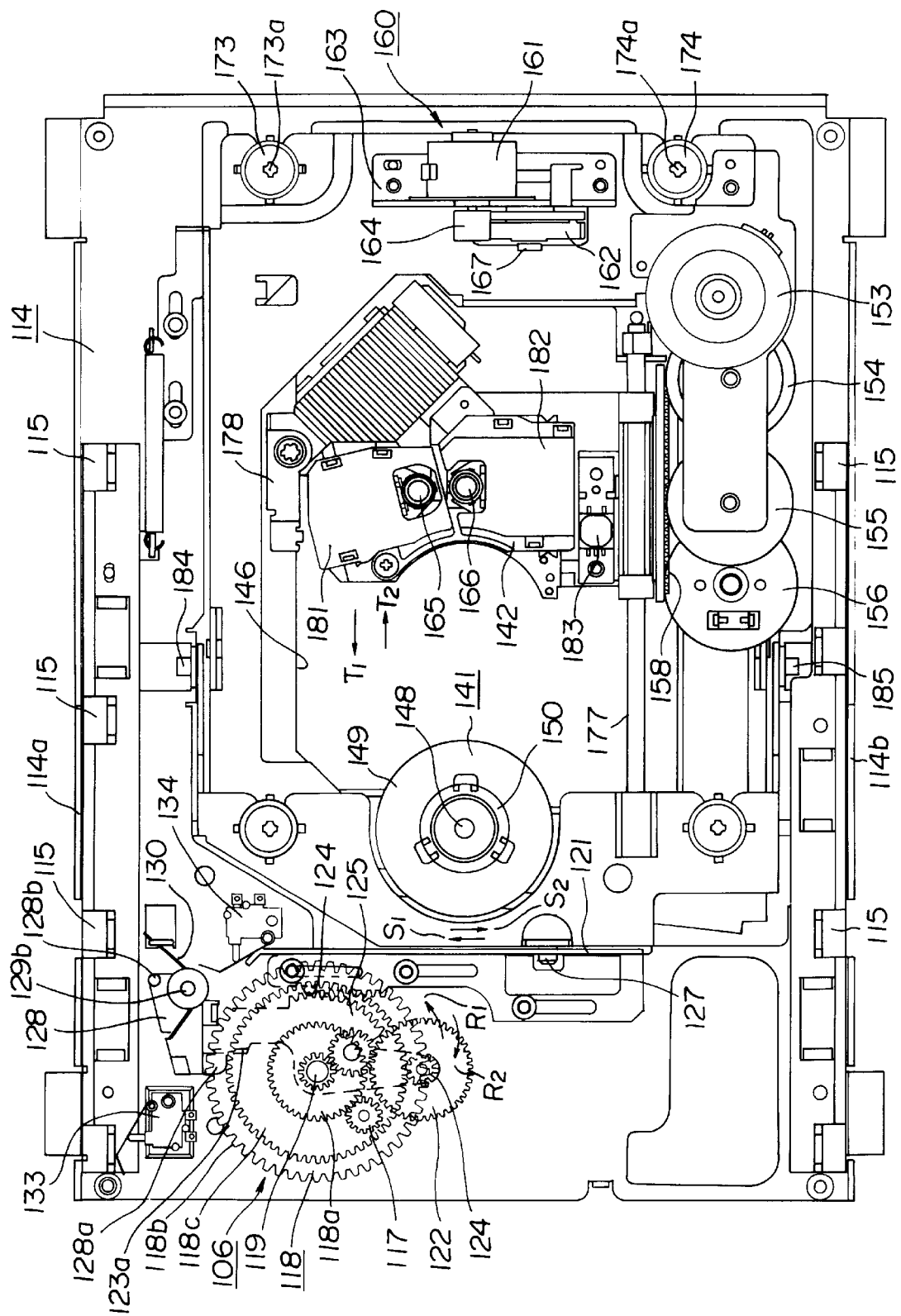
FIG. 24 is a plan view of the optical disc device with a disc driving unit in an initial state.

The loading driving mechanism 106 for moving the disc tray 102 across the inside an the outside of the main body portion 105 is arranged on the front side towards the tray inlet/outlet 104 of the chassis 114 arranged within the main body portion 105, as shown in FIGS. 23, 24. The loading driving mechanism 106 includes a loading motor 116 mounted on the bottom side on the front side of the chassis 114 and a tray feed gear 118 meshing with a driving gear 117 mounted on a driving shaft of the loading motor 116 so as to be rotated by the loading motor 116, as shown in FIGS. 23, 24. The driving gear 117 meshes with a first coupling gear 118a formed as one with the tray feed gear 118 for transmitting the driving force of the loading motor 116 to the tray feed gear 116. The tray feed gear 118 has an integral second coupling gear 118b of the maximum diameter engaged with the rack gear 108 for being thereby connected to the disc tray 102. Thus, when the loading gear 116 is driven, the disc tray 102 is fed via tray feed gear 118 across the inside and the outside of the main body portion 105.

The loading driving mechanism 106 has a swinging gear 122 for moving a lifting plate 121 for lifting or lowering a spindle motor constituting the disc driving unit 120 mounted on the chassis 114, as will be explained subsequently. The swinging gear 122 is rotatably mounted on one end of a swinging lever 124 having its mid portion supported by a supporting shaft 119 of the tray feed gear 118 for being rotated about the supporting shaft 119 as the center of rotation. This swinging gear 122 is coupled to the tray feed gear 118 by having a small-sized coupling gear 124 engaged with a third coupling gear 18c formed integrally with the tray feed gear 118. The small-sized coupling gear 124 is formed as one with the swinging gear 122. When the loading motor 116 is driven such that the tray feed gear 118 is run in rotation, the swinging gear 122 is rotated around the outer perimeter of the tray feed gear 118, depending on the direction of rotation of the tray feed gear 118, for rotating the swinging lever 124 in the directions indicated by arrows $R_1$ or $R_2$ in FIG. 24, about the supporting shaft 119 of the tray feed gear 118 as the center of rotation. On one side of a mid portion of the swinging lever 123 is formed a sector gear meshing with the rack gear 14 formed on a lateral side of the proximal end of the lift plate 121. Thus, when the swinging gear 123 is rotated in the directions indicated by arrows $R_1$ or $R_2$ in FIG. 24, the lift plate 121 is moved in the directions indicated by arrows $S_1$ or $S_2$ in FIG. 24, depending on the direction of rotation of the swinging gear 123.

Figure 25:
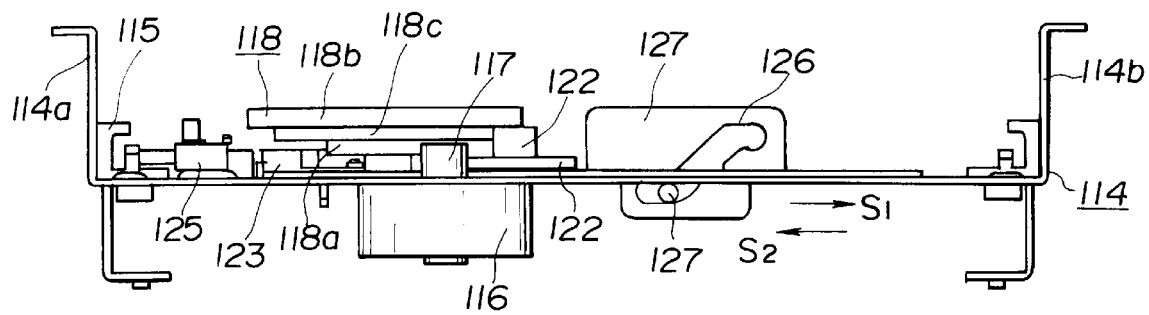
FIG. 25 is a front view showing the optical disc device with the disc driving unit in an initial state.

On the bottom surface of the chassis 114 of the lift plate 121 is formed an upstanding piece 121a formed with an inclined cam groove 126, as shown in FIG. 25. In this inclined cam groove 126 is engaged a lift pin 127 formed on the disc driving unit 120. Thus, when the lift plate 121 is moved in the directions indicated by arrow $S_1$ in FIG. 24, the lift pin 127 is moved along the inclined cam groove 126. The spindle motor on the disc driving unit 120 is moved in the up-and-down direction towards or away from the disc tray 102 moved on the chassis 114.

Meanwhile, the spindle motor on the disc driving unit 120 is lifted and lowered in a state in which the disc tray 102 is accommodated within the main body portion 105. That is, the spindle motor is moved towards the disc tray 102 during movement of the disc tray 102 for avoiding conflict of the spindle motor with the disc tray 102. To this end, the swinging lever 123 for moving the lift plate 121 has its rotational movement controlled depending on the movement position of the disc tray 102. The rotational movement of the swinging lever 123 is controlled by a lock lever 128 rotated by the disc tray 102. This lock lever 128 is supported on an upstanding supporting shaft 129 formed on the chassis 114, as shown in FIG. 24, and is mounted for rotation about the shaft 129 as the center of rotation. The lock lever 128 is biased into a rotational movement, in a direction in which the end lock portion 128a is engaged with a retention portion 123a formed on the opposite side of the lever 123 by a torsion coil spring 130 which is wound about the supporting shaft 129 and which has its arm retained between the lock lever 125 and the chassis 114.

Figure 27:
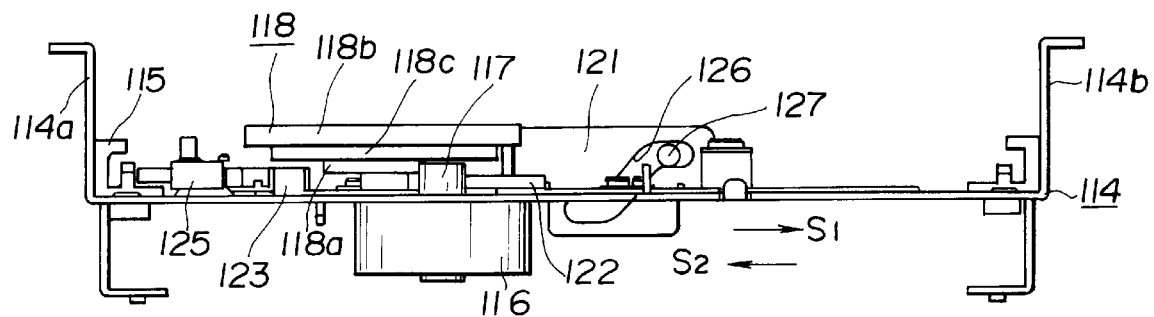
FIG. 27 is a front view showing the optical disc driving device in a state in which the disc tray has been pulled to the loading position.

When the disc tray 102 is moved to a loading position inside the main body portion 105, the lock lever 128 has its thrust pin on its proximal end thrust by a thrusting portion 128b formed on the front side on the bottom of the disc tray 102, as shown in FIG. 27. This rotates the lock lever 128 against the bias of the torsion coil spring 130 for unlocking the lock portion 128a engaged in the retention portion 123a of the swinging lever 123.

When the disc tray 102 is moved into the inside of the main body portion 105 so as to be released from the locked state by the lock lever 128, the swinging lever 123 is rotated by rotation of the tray feed gear 118 for moving the lift plate 121. When the lift plate 121 is moved in this manner, the lift pin 127 is moved along the lift cam groove 126 between the lower position shown in FIG. 25 and the upper position shown in FIG. 27.

On the chassis 114 are mounted a loading detection switch 133 for detecting that the disc tray 102 has been moved to the loading position within the main body portion 5 for stopping the driving of the loading motor 116 and a lift plate detection switch 134 for detecting the movement position of the lift plate 121.

Disc Driving Unit

A disc driving unit 140, held on the above-described disc tray 102 and having the first or second optical disc 101a, 101b loaded thereon for reproducing data recorded on the disc 101a or 101b, is explained.

This disc driving unit 140 is supported on the chassis 114 and arranged within the main body portion 105, as shown in FIG. 23. Referring to FIGS. 23 and 26, the disc driving unit 140 includes a disc rotational driving unit 141, on which is loaded the first or second optical disc 101a, 101b transported into the inside of the main body portion 105 via disc tray 102, and an optical pickup 142 for scanning the signal recording surface of the first or second optical disc 101a, 101b rotationally driven by the disc rotational driving unit 141 by an optical beam for reading out data recorded on the first or second optical disc 101a, 101b. The disc driving unit 140 also includes a disc damper 143 for clamping the first or second optical disc 101a, 101b, set on the disc table 143 of the disc rotational driving unit 141, in cooperation with the disc table 143.

Figure 28:
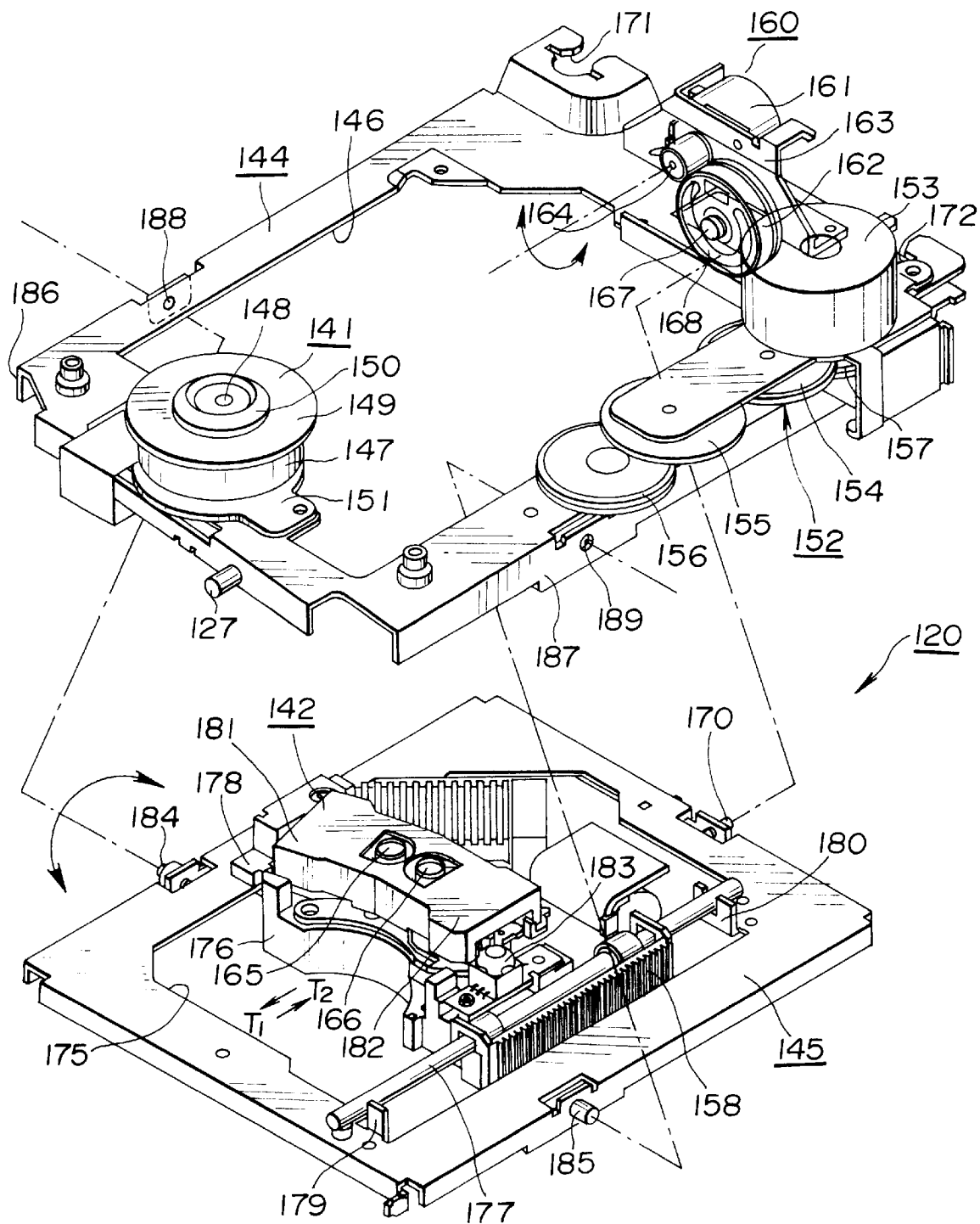
FIG. 28 is an exploded perspective view showing a first supporting frame carrying a disc rotating device and a second supporting frame supporting an optical pickup.

The disc rotational driving unit 141 and the optical pickup 142 are mounted on separate first and second supporting frames 144, 145, respectively, as shown in FIG. 28.

The first supporting frame 144, in which is mounted the disc rotational driving unit 141, is formed by punching a thin metallic plate and warping the rim portions into a rectangular shape, as shown in FIG. 28. This first supporting frame 144 has a substantially rectangular aperture 146 at a mid position thereof for facing the optical pickup 142 mounted on the second supporting frame 145. The disc rotational driving unit 141 is mounted on the forward side of the first supporting frame 144, that is on the side of the first supporting frame 144 positioned towards the tray inlet/outlet 104 when the first supporting frame 144 is supported on the chassis 114 and arranged within the main body portion 105.

Meanwhile, the disc rotational driving unit 141 is made up of a spindle motor 147 and a disc table 149 mounted integrally on the distal end of a driving shaft 148 of the spindle motor 147. At a mid upper end of the disc table 148 is formed a centering member 150 for being moved back and forth along the axis of the driving shaft 148. The centering member is adapted for being engaged in a center opening 101c of the first or second optical disc 101a, 101b loaded on the disc table 149.

The disc rotational drivng mechanism 141 is mounted with a mounting plate 151 on the outer perimeter of the spindle motor 147 secured to the first supporting plate 144, with the driving shaft 148 extending at right angles with the first supporting frame 144.

On a lateral side of the first supporting plate 144 is arranged a pickup feed mechanism 152 configured for feeding the optical pickup 142 mounted on the second supporting frame 145 along the radius of the first or second optical disc 101a, 101b set on the disc table 149. This pickup feed mechanism 152 has a pickup feed motor 153 and first to third interconnected driving force transmitting gears 154 to 156 rotationally driven by this pickup feed motor 153. The first driving gear 154 is connected to a driving gear 157 mounted on a driving shaft f the feed motor 153, while the third force transmitting driving gear 156 is connected to a rack gear 158 provided on the optical pickup 142.

On the rear end of the first supporting frame 144 opposite to the front side thereof carrying the disc rotational drivng unit 141 is arranged a skew control mechanism 160 configured for rotating the second supporting frame 145 for controlling the tilt of the optical pickup 142 relative to the first or second optical disc 101a, 101b set on the second supporting frame 145, as shown in FIG. 28. This skew control mechanism 160 has a skew motor 161 and a cam gear 162 rotationally driven by this skew motor 161. The skew motor 161 and the cam gear 162 are mounted via a mounting plate 163 mounted upright on the rear end of the first supporting frame 144. That is, the skew motor 161 is mounted on the mounting plate 163 so that a driving shaft 164 is perpendicular to the driving shaft 148 of the spindle motor 147, that is so that the driving shaft 164 will be perpendicular to the optical axes of the first and second objective lenses 165, 166 making up the optical pickup 142. The cam gear 162 is also mounted, via an upstanding supporting shaft 167 mounted on the mounting plate 163, so that its plane of rotation will be perpendicular to the optical axes of the of the first and second objective lenses 165, 166 making up the optical pickup 142.

In the major surface of the cam gear 162 is formed an arcuately-shaped cam groove 168. This cam groove 168 is formed in a helix centered about the rotational center of the cam gear 162, with the radius of the cam gear being different in radius from one end towards the opposite end. In the cam groove 168 is formed a lift pin 127 engaged in the inclined cam groove 126 formed in the lift plate 121 arranged on the chassis 114.

On both ends on the rear end of the first supporting frame 144 are mounted insulator mounting portions 171, 172, in which are mounted insulators 173, 174 formed of an elastic material, such as rubber. The first supporting frame 144 is supported on the chassis 114 by having these insulators 173, 174 supported by supporting shafts 173a, 174a set upright in the chassis 114.

The first supporting frame 144, having its both lateral rear ends supported by paired elastically flexible insulators 173, 174 on the chassis 114 and having the front side lift pin 127 inserted into and engaged in the inclined cam groove 126 formed in the lift plate 121, is rotated about paired insulators 173, 174 as center by the lift plate 121 being moved in the directions indicated by arrows S1, $S_2$ in FIG. 24 and by the lift pin 127 moved in the up-and-down direction along the inclined cam groove 126. By the first supporting frame 144 being rotated about the paired insulators 173, 174 mounted on the rear side as fulcrum points, the disc rotational drivng unit 141 mounted on the front side is lifted and lowered with respect to the disc tray 102.

Similarly to the first supporting frame 144, the second supporting frame 145, carrying the optical pickup 142, is formed in a rectangular shape by warping a thin metal sheet and warping the rm portions, as shown in FIG. 28. In this second supporting frame 145 is formed a substantially rectangular center aperture 175 for arranging the optical pickup 142 therein.

The optical pickup 142, mounted on the second supporting frame 145, is mounted on a lateral side of an optical block 176 housing optical components therein. On one side of the center aperture 175 is mounted a guide shaft 176 for supporting the optical pickup 142 and for guiding the movement direction, as shown in FIG. 28. On the opposite side of the optical block 176 to the side carrying the guide shaft 176 is mounted a guide support 177 of a U-shaped cross-section engaged with the lateral edge of the aperture 175. The optical pickup 142 is mounted on the second supporting frame 145 for movement in a direction parallel to the guide shaft 177, with the guide shaft 177 as a reference, by having a guide support 177 engaged with the lateral edge of the aperture 175 and by having both ends of the guide shaft 177 supported by support pieces 179, 180 formed on the second frame 145. On the outer lateral side of the optical pickup 142 carrying the guide shaft 177 is mounted a rack gear 158. When the second supporting frame 145 is supported by the first support frame 144, the rack gear 158 meshes with the third force transmitting driving gear 156 of the pickup feed mechanism 152.

Therefore, when the driving motor 172 of the pickup feed mechanism 152 is driven, the driving force of the driving power is transmitted to the rack gear 158 via first, second and third driving force transmitting gears 145 to 156, so that the optical pickup 142 is moved in the directions indicated by arrows $T_1$ and $T_2$ in FIG. 28. That is, when the second supporting frame 145 is supported on the first supporting frame 144, the optical pickup 142 is moved n a direction along the radius of the first or second optical disc 101a, 101b set on the disc table 149, that is in a direction towards and away from the disc rotational driving mechanism 141.

Meanwhile, since it is intended with the present optical disc driving device of the instant embodiment to render it possible to selectively reproduce the optical disc 101a with the standard recording density or the second optical disc 101b with high recording density, such as DVD, the optical pickup 142 employed in the present device includes a first pickup unit 181 having an optical system as a laser light source optimized for the first optical disc 101a and a second pickup unit 182 separated from the first optical pickup unit 181 and having an optical system as a laser light source optimized for the second optical disc 101b. The first and second objective lenses 165, 166 converging and radiating the light beam from the laser light sources on the first or second optical disc 101a, 101b are provided on the pickup units 181, 182, respectively, as shown in FIGS. 24 and 28.

Meanwhile, in the optical pickup 142, the second objective lens 166 is arranged on a line parallel to the movement direction of the optical pickup 142, while the first objective lens 165 is arranged with a pre-set angular offset with respect to the second objective lens 166. In this manner, the light beam radiated from the second objective lens 166 for scanning the second objective lens 166 can scan the recording track with higher accuracy.

On the upper surface of the optical block 176 of the optical pickup 142 are loaded the optical pickup 142 and a skew sensor 183 comprised of a light emitting element and a light receiving element for detecting the relative tilt between the optical disc 142 and the second optical disc 101b loaded on the disc table 149. The skew sensor measures the time which elapses until the light radiated from the light emitting element is reflected by the second optical disc 101b loaded on the disc table 149 so as to be received by the light receiving element for detecting the skew state.

Figure 29:
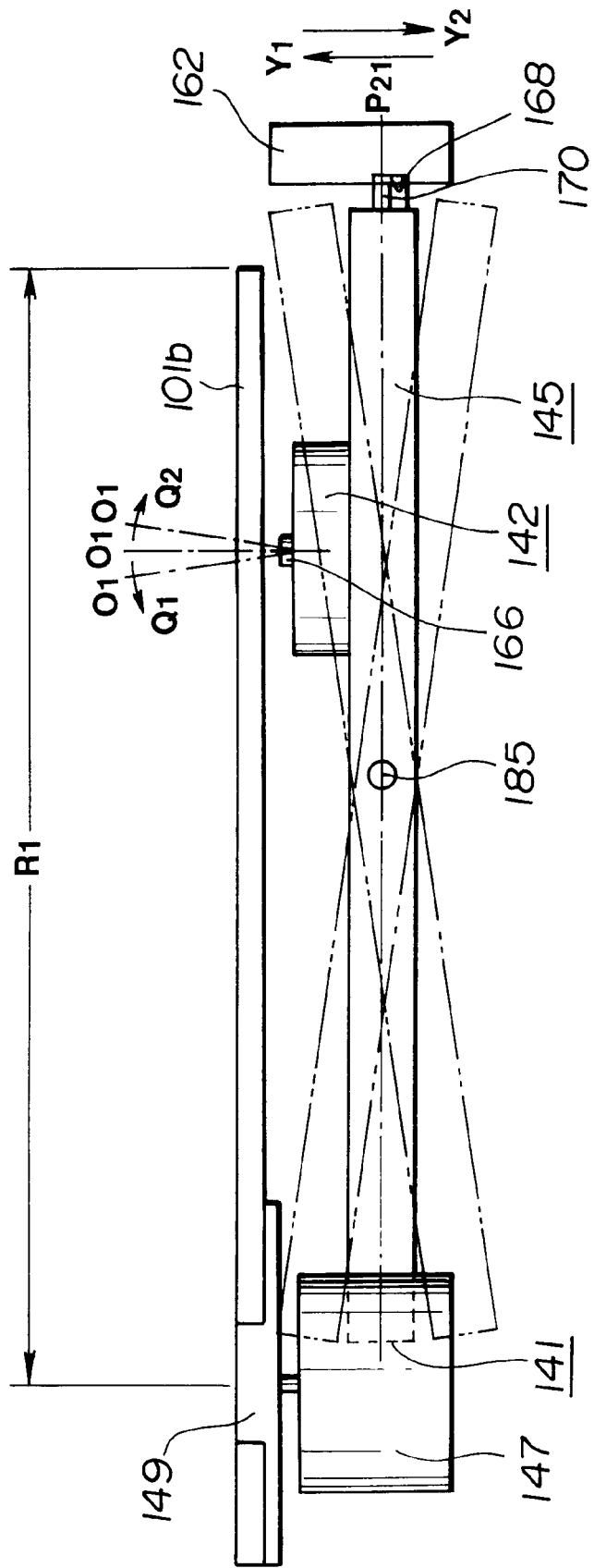
FIG. 29 is a schematic side view showing the state in which the second supporting frame has been rotated and skew control is being carried out.

At mid portions on the opposing lateral sides of the second supporting frame 145 parallel to the movement direction of the optical pickup 142 are protuberantly formed a pair of supporting pins 184, 185, as shown in FIG. 28. The second supporting frame 145 is supported on the first supporting frame 144 by passing the supporting pins 184, 185 in through-holes 188, 189 formed in opposing sidewall sections 186, 187 on the first supporting frame 144 and by engaging the engagement pins 170 on the rear end face in the cam groove 168 formed in the cam groove 162 of the skew control mechanism 160. In this manner, the cam gear 162 is rotated by the skew motor 161 and the engagement pin 170 is moved in the up-and-down direction in the directions indicated by arrows $Y_1$, $Y_2$ in FIG. 29, depending on the amount of offset of the cam groove 168, so that the second supporting frame 145 supported by the first supporting frame 144 is rotated in the directions indicated by arrows $X_1$, $X_2$ in FIG. 29, about the supporting pins 184, 185 as the center of rotation. By the optical pickup 142 being moved in the up-and-down direction as indicated by arrows $Y_1$ and $Y_2$ relative to the horizontal reference plane $P_{21}$, as shown in FIG. 29, the optical axis $O_1$ of the second objective lens 166 is tilt-controlled in the directions indicated by arrows $Q_1$ or $Q_2$ in FIG. 29 relative to the major surface of the second optical disc 101b set on the disc table 149, with the optical axis of the second objective lens 166 of the optical pickup 142 being perpendicular to the signal recording surface of the second optical disc 101b, by way of performing a radial skew control operation.

This radial skew control operation is carried out depending on a detection output obtained by the skew sensor 183.

Meanwhile, the radial skew control operation by the skew control mechanism is performed only in case the second optical disc 101b is loaded in position.

A pair of supporting pins 184, 185 constituting rotational pivot points of the second supporting frame 145 are provided substantially at the center of a radius $R_1$ of the optical disc 101b loaded on the disc table 149. By providing the supporting pins 184, 185 at such position, the radial skew control operation for the optical pickup 142 relative to the optical disc 101b can be realized with a reduced amount of rotation of the second supporting frame 145 for reducing the thickness of the disc driving unit 140 and hence that of the disc driving device.

The disc driving unit 140 is provided with the disc clamper 143 for clamping the first or second optical disc 101a, 101b set on the disc table 149 in cooperation with the disc table 149. The disc clamper 143 is mounted on a disc clamper supporting plate 191 mounted horizontally across upper ends of left and right sidewall sections 114a, 114b of the chassis 114, as shown in FIG. 23.

Playback Operation for the First or Second Optical Discs

Figure 30:
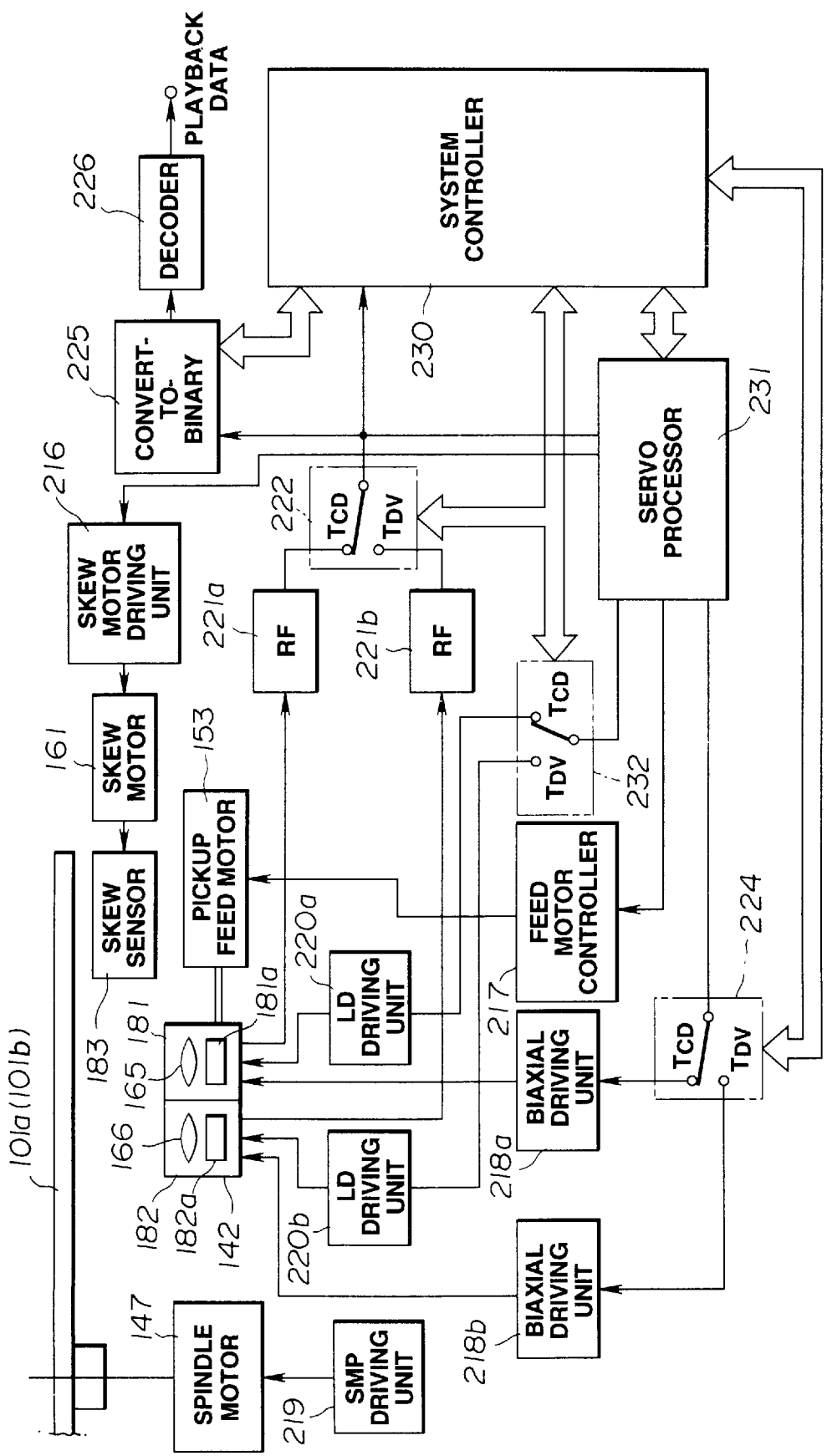
FIG. 30 is a block diagram showing a control circuit section of an optical disc driving device according to a second embodiment of the present invention.
Figure 31:
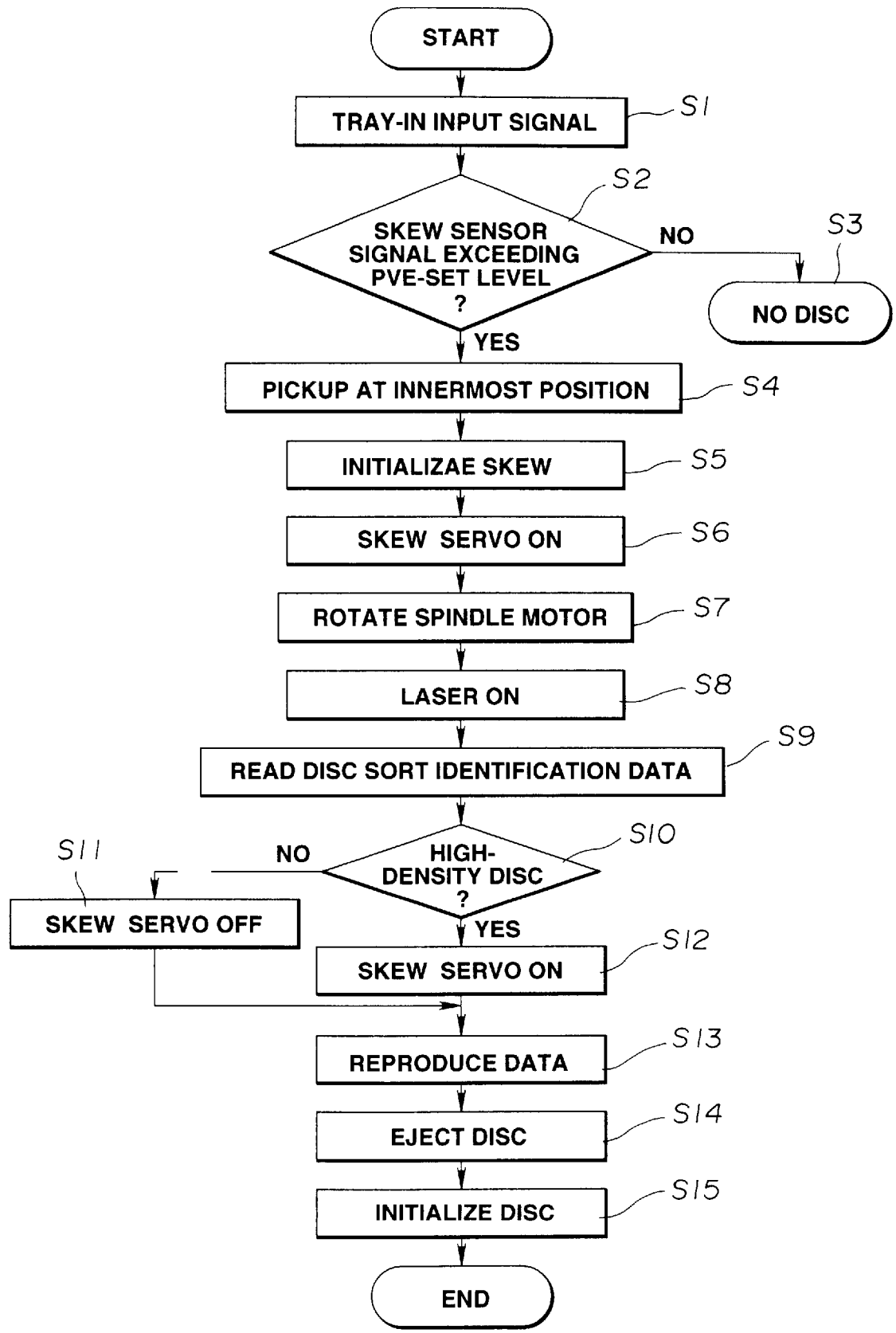
FIG. 31 is a flowchart showing the control operation of the optical disc drive device.

The operation of reproducing the first or second optical disc 101a, 101b by the above-described second embodiment of the optical disc driving device is explained by referring to the block diagram of the optical disc driving device of the present embodiment shown in FIG. 30 and to a flowchart shown in FIG. 31.

The first optical disc 101a is an optical disc, 12 cm in diameter, having a standard recording density, such as CD or CD-ROM, while the second optical disc 101b is an optical disc, similarly 12 cm in diameter, having a high recording density, such as DVD.

For reproducing the above-described first or second optical disc 101a, 101b, the power source for the optical pickup device is turned on and the disc tray 101 is pulled out of the main body portion 105. The first or second optical disc 101a, 101b is then held on the disc holder 3 and the disc tray 102 is moved towards the inner side of the man body portion 5 by way of performing the loading operation.

When the disc tray 102 has been moved into the inside of the main body portion 105, the loading switch 133 detects that the disc tray 102 has been moved as far as the loading position, and the loading motor 116 is halted transiently.

When the movement of the disc tray 102 to the loading position is detected, and the loading motor 116 is halted transiently, the loading motor is driven in the reverse direction. At this time, the lock lever 128 is rotated by the thrusting portion 132 provided on the dis tray 102, against the bias of the spring 130, thus unlocking the swinging lever 123. When the lift plate 121 is moved in this manner, the lift pin 127 provided on the first supporting frame 145 of the disc driving unit 140 is moved from the position below the inclined cam groove 126 shown in FIG. 25 to an upper position shown in FIG. 27. The first supporting frame 145 is lifted towards the disc tray 102, about the insulators 173, 174 as the center of rotation, so that the first or second optical disc 101a, 101b held on the disc tray 102 is set on the disc table 149, at the same time as the disc damper 143 is pressed towards the disc table 149 for clamping the first or second optical disc 101a, 101b for enabling the disc 101a or 101b to be rotated in unison with the disc table 149. When the lift plate 121 has moved the first supporting frame 145 to is uplifted position of clamping the first or second optical disc 101a, 101b to the disc table 149, the lift plate detection switch 134 is actuated and the loading motor 116 is stopped to detect the completion of loading. When the completion of loading is detected by the lift plate detection switch 134, the spindle motor 147 of the disc rotational driving mechanism 141 starts to be rotated, at the same time as the skew sensor 183 is turned on.

With the present optical disc driving device, as described above, it is checked whether the optical disc to be reproduced is the first optical disc 101a with the standard recording density or the second optical disc 101b with the high recording density and data is reproduced under a condition appropriate for the optical disc, that is by switching between the first optical pickup unit 181 for the first optical disc 101a and the second optical pickup unit 182 for the second optical disc with the high recording density and by setting skew servo on/off.

The first optical disc 101a is a CD or a CD-ROM, while the second optical disc 101b is a DVD.

The operation of reproducing the optical disc driving device of the instant embodiment is now explained by referring to the block diagram of FIG. 30 and the flowchart of FIG. 31.

First, if, at step S1 in FIG. 31, the system controller 30 receives a signal to the effect that the above-mentioned loading detection switch 133 has detected movement of the disc tray 102 to the loading position, the system controller actuates a servo processor 231.

At step S2, the servo processor 231 judges, based on the signal level of the output signal of the skew sensor 183, whether any optical discs has been loaded on the disc tray 102. Specifically, the skew sensor 183 detects the distance as far as the recording surface of the optical disc, as described above, and outputs a detection signal of a level inversely proportionate to the detected distance. If no optical disc is loaded on the disc tray 102, the detection signal level is decreased. The servo processor 231 checks whether or not the detection signal of the skew sensor 183 is not less than a pre-set value in order to decide whether or not any optical disc is loaded. If the result is YES, the servo processor 231 transfers to step S4. If otherwise, the servo processor 231 transfers to step S3.

At step S3, data specifying that no disc is loaded is sent by the servo processor 231 to a system controller 230 which then controls the optical disc driving device in its entirety for not performing further operations, while advising the host computer of that effect.

At step S4, the servo processor 231 sends a signal for moving the optical pickup 142 to the innermost radial position of the optical disc to a feed motor driving unit 217 of the pickup feed mechanism 152. The feed motor driving unit 217 amplifies this signal to drive the feed motor 153.

Thus the optical pickup 142 is positioned at the innermost radial position of the optical disc.

At step S5, the servo processor 231 initializes the skew. That is, the servo processor 231 sends a signal of setting the optical pickup 142 to the horizontal position to a skew driving unit 216 of the skew adjustment mechanism. The skew driving unit 216 amplifies the signal for driving the skew motor 9. This sets the optical pickup 142 to its horizontal position.

At step S6, the servo processor 231 turns the skew servo on. That is, based on the detection signal from the skew sensor 183, the servo processor 231 sends to the skew driving unit 216 a signal setting a constant level of the detection signal.

Substantially simultaneously, at step S7, the servo processor 231 sends to the spindle motor driving unit 219 a signal for causing rotation of the spindle motor 147 at an rpm corresponding to the accepted standard rpm in a CD player. The spindle motor driving unit 219 amplifies this signal for driving the spindle motor 147. This causes rotation of the optical disc. At this time, the rpm of the spindle motor 147 is detected for performing servo control for assuring a constant linear velocity using a rpm detection mechanism, not shown.

At step S8, the system controller 230 controls the changeover switches 222 to 224 for connecting a changeover contact $T_{CD}$ in circuit. The servo processor 231 sends a signal of causing light emission of a laser diode for CD 181a to a laser diode driving unit 220a. The laser diode driving unit 220a amplifies this signal so that the outgoing light will be at a level appropriate for reproduction and drives the laser diode for CD 181a. The laser light radiated by the laser diode for CD 181a is converged by the objective lens 165 so as to be radiated on and reflected by the recording surface of the optical disc. The reflected light, that is the return light, is changed in signal level depending on the presence or absence of, for example, pits, pre-formed on the recording surface of the optical disc. The return light is separated by a beam splitter so as to be incident on the photodetector. The components for the beam splitter are not illustrated in the drawings. The photodetector outputs an RF signal depending on the light volume of the return light. Thus the optical pickup 142 outputs RF signals corresponding to the information (data) recorded on the optical disc.

Meanwhile, the optical pickup 142 outputs focusing error signals or tracking error signals, in addition to the RF signals by, for example, the so-called astigmatic method or the differential amplification method.

Since the optical pickup 142 has been moved at step S9 to the innermost radial position of the optical disc, that is to the TOC recording position, the optical pickup 142 outputs RF signals corresponding to TOC. An RF signal amplifier 221a waveform-equalizes and amplifies the RF signals and routes the resulting signals via changeover switch 222 to a bi-level circuit 225, while routing the focusing error signals and the tracking signals to the servo processor 231. The bi-level circuit 225 discriminates the RF signals to reproduce the EFMed data to supply the reproduced data to a decoder 226. The decoder 226 decodes the modulated data to route the resulting reproduced data to the system controller 230. Since the reproduced data is data corresponding to the TOC, disc sort identification data for identifying the optical disc type is contained therein. If the discrimination of the optical disc as later explained has come to a close and the usual playback operation is preformed, the reproduced data is outputted to the host computer.

At step S11, the system controller 230 discriminates, based on the sort identification data supplied from the decoder 226, whether the optical disc loaded on the disc tray 102 is the high recording density optical disc 101b, that is the DVD. If the result is YES, the system controller 30 proceeds to step S12 and, if otherwise, to step S11.

At step S11, the system controller 230 sends data specifying that the optical disc loaded on the disc tray 102 is the first optical disc 101a, that is the CD or the CD-ROM, to the servo processor 231, which then stops, that is turns off, the skew servo, that is, sends a value 0 signal (that is, sends nothing) to the skew driving unit 216, irrespective of the value of the detection signal from the skew sensor 183.

On the other hand, the system controller 230 routes data specifying that the loaded optical disc is the second optical disc 101b at step S12 to the servo processor 231, which then maintains the on-state of the skew servo and simultaneously sends to the spindle motor driving unit 219 a signal of causing rotation of the spindle motor 147 at an rpm corresponding to the accepted standard rpm of the DVD. The system controller 230 also controls the changeover switches 222 to 224 for connecting the changeover contact $T_{DV}$ in circuit.

At step S13, data reproduction from the optical disc is performed depending on the sort of the optical disc. That is, if the loaded optical disc is the second optical disc 101b, the servo processor 231 sends a signal of causing light emission of a laser diode 182a for the second optical disc 101b via changeover switch 223 to a laser diode driving unit 220b, which then amplifies this signal so that the outgoing light will be at an appropriate signal level for reproduction for driving the laser diode 182a.

If the loaded optical disc is a CD, that is the first optical disc 101a, the servo processor 231 performs the above-described operation of step S8. Therefore, the detailed description is not made for simplicity. It should be noted that the servo processor 231 sends control signals via changeover switch 224 to bi-axial diving units 218a, 218b based on the focusing error signals and focusing error signals supplied thereto via changeover switch 222, so that these signals will be zero, by way of applying focusing servo and tracking servo.

If, at step S14, the user performs an operation for terminating the data reproduction, and the disc tray 102 is pulled out, the system controller 230 receives a signal that the loading detection switch 230 has detected movement of the disc tray 102 to the loading position, and causes cessation of the playback operation of the servo processor 31 and so forth.

At step S15, the servo processor 231 performs the above-described operation of the step S5 for initializing the skew.

Figure 32:
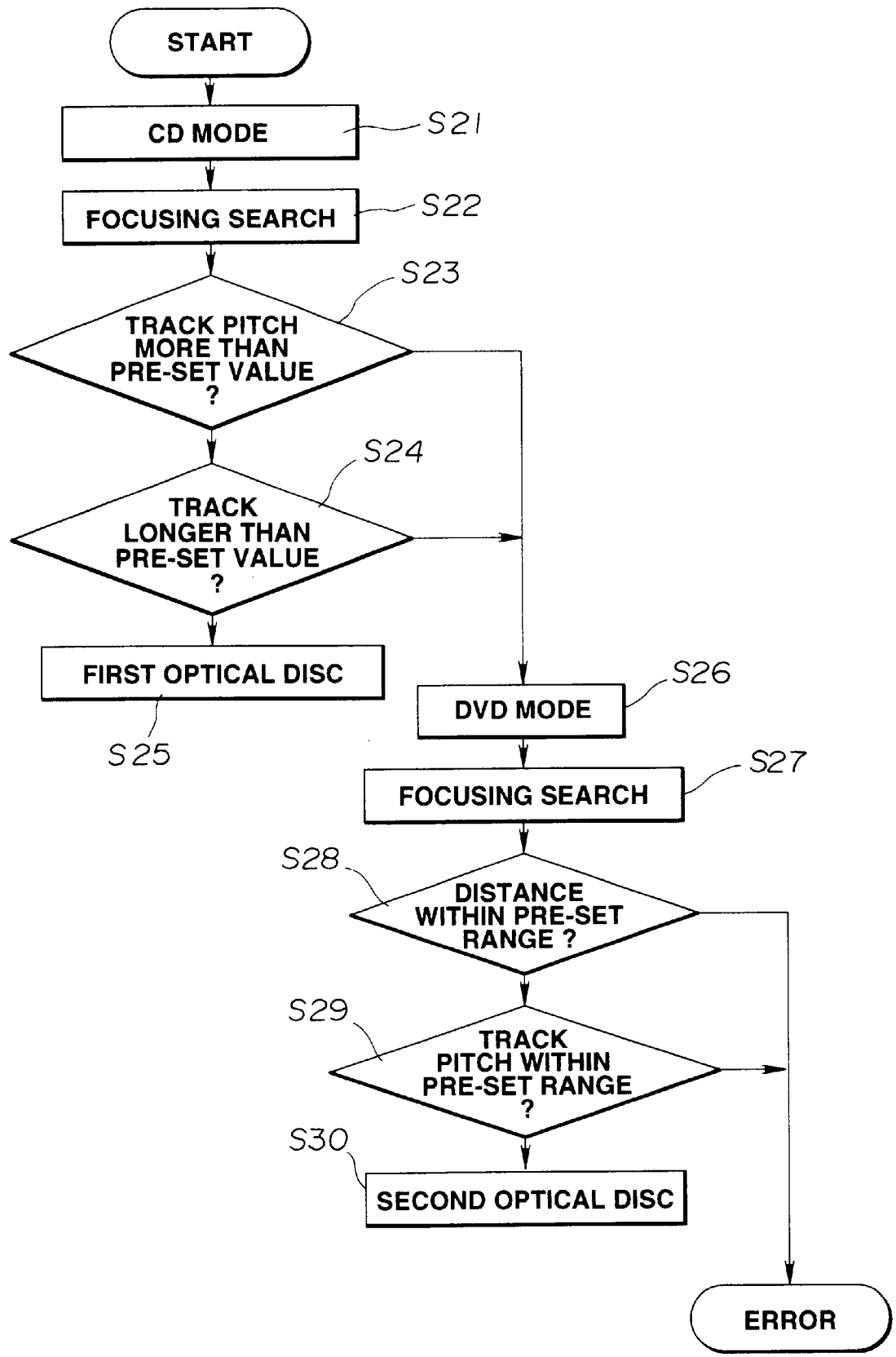
FIG. 32 is a flowchart for illustrating the specified operation when an optical disc not having disc sort identification data recorded thereon is loaded on the optical disc drive device.

In the above description on the operation, it is assumed that the disc sort discrimination data for optical disc sort identification has been pre-recorded on the optical disc. The illustrative operation for a case in which no disc sort identification data is recorded on the optical disc is explained by referring to the flowchart of FIG. 32.

At step S21, the system controller 230 controls the servo processor 231 and the changeover switches 222 to 224 for operating the optical disc driving device in the CD mode. Specifically, the servo processor 231 causes the spindle motor 147 to be rotated at the same velocity as that for the CD. The servo processor 231 also causes the laser diode 181a to emit light, while connecting the changeover switches 222 to 224 in circuit and turning the tracking servo on.

At step S22, the system controller 230 issues a command for detecting the focusing distance of the objective lens 165 to the servo processor 231, which then sends a signal with a linearly changed signal level, for gradually approaching or separating the objective lens 165 to or from the optical disc via the changeover switch 224 to the bi-axial driving unit 218a. The servo processor 231 also monitors the focusing error signal supplied via changeover switch 222 and detects the level of the signal supplied to the bi-axial driving unit 218a when the focusing error signal has become equal to zero. The servo processor 231 sends data specifying this level, that is data specifying the focusing distance of the objective lens 165 from the recording surface of the optical disc, to the system controller 230.

At step S23, the system controller 230 checks whether or not the distance data supplied from the servo processor is larger than a pre-set level. If the result is YES, the system controller 230 proceeds to step S24 and, if otherwise, to step S26.

At step S24, the servo processor 231 sends data specifying the level of a signal supplied to the motor driving unit 217 for linear feed of the optical pickup 142, that is data specifying the track pitch. The system controller 230 judges whether or not the data is not less than a pre-set value. If the result is YES, the system controller 230 proceeds to step S25 and, if otherwise, to step S26.

At step S25, the system controller 230 decides that the optical disc loaded on the disc tray 102 is the CD, that is the first optical disc 101a, and accordingly performs the operation of the step S13 and the following steps as shown in FIG. 31.

On the other hand, the system controller 230 controls the servo processor 231 and the changeover switches 222 to 224 at step S26 to cause the operation of the optical disc driving device under the DVD mode. Specifically, the servo processor 231 causes the spindle motor 147 to be operated under the DVD mode. Specifically, the servo processor 231 causes the spindle motor 147 to be rotated at the same velocity as the second optical disc 101b, that is the DVD, while causing the laser diode 182a to emit light. In addition, the servo processor 231 connects the changeover terminal $T_{VD}$ in circuit, while turning the tracking servo on.

At step S27, the system controller 230 issues a command for detecting the focusing distance of the objective lens 166 to the servo processor 231, which then sends a signal with a linearly changed signal level for gradually approaching or separating the objective lens 166 to or from the optical disc via the changeover switch 224 to the bi-axial driving unit 218a. The servo processor 231 also monitors the focusing error signal supplied via changeover switch 222 and detects the level of the signal supplied to the bi-axial driving unit 218b when the focusing error signal has become equal to zero. The servo processor 231 sends data specifying this level, that is data specifying the focusing distance of the objective lens 166 from the recording surface of the optical disc, to the system controller 230.

At step S28, the system controller 230 checks whether or not the distance data supplied from the servo processor is within a pre-set level. If the result is YES, the system controller 230 proceeds to step S29 and, if otherwise, to step S31.

At step S29, the servo processor 231 sends data specifying the level of the signal supplied to the motor driving unit 217 for linear feed of the optical pickup 142, that is data specifying the track pitch. The system controller 230 judges whether or not the data is not less than a pre-set value. If the result is YES, the system controller 230 proceeds to step S30 and, if otherwise, to step S31.

At step S30, the system controller 230 decides that the optical disc loaded on the disc tray 102 is the DVD, that is the second optical disc 101b, and accordingly performs the operation of the step S13 and the following steps, as shown in FIG. 30.

At step S31, the system controller 230 deems that no optical disc has been set on the disc tray 102, or that an optical disc other than the CD or DVD is loaded thereon, and controls the optical disc driving device in its entirety for not performing further operations, while advising the host computer of that effect.

In the present optical disc driving device according to the present invention, the recording medium may also be a disc cartridge comprised of a cartridge and an optical disc housed therein.

Although the above-described embodiments are directed to an apparatus for exclusively reproducing data recorded on an optical disc, the present invention may also be applied to a recording/reproducing apparatus also having data recording means.

INDUSTRIAL APPLICABILITY

With the above-described optical disc driving device and the recording/reproducing method according to the present invention, since the first optical disc having the standard data recording density and the second optical disc having the high recording density are adapted to be selectively used for recording and/or reproducing data, while the sort of the loaded optical disc is discriminated, such that the skew control mechanism is actuated only in recording/reproducing data on or from the second optical disc with high recording density for adjusting the relative tilt between the objective lens and the second optical disc, it becomes possible to set verticality between the second optical disc and the objective lens to high precision for recording and/or reproducing data on or from the second optical disc of high recording density with good recording/reproducing characteristics.

In addition, since the relative tilt between the objective lens and the optical disc is not controlled if data is recorded and/or reproduced on or from the first optical disc with standard data recording density, the range of tilt control for the objective lens by the skew control mechanism can be suppressed to a smaller value for reducing the size of the disc driving device.

We claim:

1. An optical disc driving device comprising:
   disc rotating driving means having selectively loaded thereon a first optical disc with a data recording density being a first recording density or a second optical disc with a data recording density being a second recording density higher than that of said first optical disc;
   an optical pickup having an objective lens for converging a light beam radiated from a light source for radiating the converged light beam on said first optical disc or said second optical disc;
   means for determining whether the first optical disc or the second optical disc is loaded on the disc rotating driving means; and
   skew control means for performing radial skew control when the second optical disc is loaded on the disc rotating driving means by adjusting a tilt between the objective lens and the second optical disc, and for inhibiting radial skew control when the first optical disc is loaded on the disc rotating driving means.

2. The optical disc driving device as claimed in claim 1 wherein said skew control means controls tilt of a spindle motor for controlling the tilt of the second optical disc relative to the objective lens, said spindle motor being adapted for rotationally driving a disc table, said disc rotating driving means having a disc table on which is loaded said optical disc.

3. The optical disc driving device as claimed in claim 2 wherein said spindle motor has its tilt controlled by being rotated about a pair of rotational pivots arranged on both sides extending perpendicular to the axis of a driving shaft thereof.

4. The optical disc driving device as claimed in claim 2 wherein a direction of tilt of the spindle motor is parallel to a direction along which the optical pickup is moved.

5. The optical disc driving device as claimed in claim 2 wherein said skew control means varies a height position of said spindle motor during skew control on time and skew control off time for varying a distance between said optical disc and the objective lens.

6. The optical disc driving device as claimed in claim 1 wherein said optical pickup has a first objective lens for radiating a light beam on said first optical disc and a second objective lens for radiating a light beam on said second optical disc.

7. An optical disc driving device comprising:
   disc rotating driving means having selectively loaded thereon a first optical disc with a data recording density being a first recording density or a second optical disc with a data recording density being a second recording density higher than that of said first optical disc;
   an optical pickup having an objective lens for converging a light beam radiated from a light source for radiating the converged light beam on said first optical disc or said second optical disc;
   means for discriminating a sort of the optical disc loaded on said disc rotating driving means, said disc sort discriminating means discriminating the sort of the optical disc loaded on a disc table using return light information from the optical disc obtained under a condition in which the light beam outputted from the optical pickup on the optical disc loaded on said disc rotating driving means is focused on the surface of the optical disc and the return light information from the optical disc obtained under a condition in which said light beam is focused on a signal recording surface of said optical disc;
   skew control means for controlling the tilt between said objective lens and said optical disc loaded on said disc rotating driving means; and
   skew control stop means for stopping skew control by said skew control means when said discrimination means detects said first optical disc.

8. The optical disc driving device as claimed in claim 7 wherein said return light information is a light volume signal of the return light from the optical disc.

9. The optical disc driving device as claimed in claim 7 wherein said return light information is a focusing error signal associated with the focusing state of said light beam radiated on said optical disc.

10. An optical pickup device comprising:
    disc transfer means for holding a first optical disc with a data recording density being a first recording density or a second optical disc with a data recording density being a second recording density higher than that of said first optical disc,
    horizontally moving said first optical disc and said second optical disc across the inside and the outside of a main body portion of the device for transferring said first optical disc or said second optical disc;

disc rotating and driving means on which is loaded the first optical disc or the second optical disc transferred by said disc transfer means;

first supporting means for rotatably supporting said disc rotating driving means in a direction towards and away from said disc transfer means;

rotating driving means for rotationally driving said first supporting means;

an optical pickup having an objective lens for converging a light beam radiated from the light source for radiating the converged light beam on said first optical disc or said second optical disc;

second supporting means supporting said optical pickup and supported by said first supporting means for rotation in the direction of the optical axis of said objective lens;

means for discriminating the sort of the optical disc loaded on said disc rotating driving means;

skew control means adapted for rotating said second supporting means for controlling a relative tilt between said objective lens and the first optical disc or said second optical disc loaded on said disc rotating driving means; and skew control stop means for stopping skew control by said skew control means when said discrimination means detects said first optical disc.

11. The optical disc driving device as claimed in claim 10 wherein a direction of tilt of said optical pickup is parallel to a direction along which the optical pickup is moved.

12. The optical disc driving device as claimed in claim 10 wherein disc sort discriminating means discriminates the disc sort based on a disc sort identification data recorded on said optical disc and read out by said optical pickup.

13. The optical disc driving device as claimed in claim 10 wherein said disc sort discriminating means discriminates the sort of the optical disc loaded on the disc table using return light information from the optical disc obtained under a condition in which the light beam outputted from the optical pickup on the optical disc loaded on said disc rotating driving means is focused on the surface of the optical disc and the return light information from the optical disc obtained under a condition in which said light beam is focused on a signal recording surface of said optical disc.

14. The optical disc driving device as claimed in claim 10 wherein said optical pickup has a first objective lens for radiating a light beam on said first optical disc and a second objective lens for radiating a light beam on said second optical disc.

15. A disc driving device comprising:

a disc table that supports a disc;

a spindle motor connected to the disc table that rotationally drives the disc table;

an optical pickup that focuses a light beam on a disc supported on the disc table;

a discriminator circuit that detects a disc type from a plurality of disc types when a disc is supported on the disc table, the plurality of disc types including a first disc type and a second disc type; and a skew control circuit that detects a radial skew between an axis of the light beam and a disc supported on the disc table, the skew control circuit correcting for the radial skew when the second disc type is detected by adjusting a tilt between the disc and the axis of the light beam, and not correcting for the radial skew when the first disc type is detected.

16. The disc driving device of claim 15 wherein the optical pickup includes a first objective lens and a second objective lens, the first objective lens radiating a light beam when the first disc type is detected, the second objective lens radiating a light beam when the second disc type is detected.

17. The disc driving device of claim 15 wherein the skew control circuit includes a skew control positioner connected to the spindle motor that changes a position of the spindle motor to correct for the radial skew, the skew control positioner leaving the spindle motor in an initial position when the first disc type is detected.

18. The disc driving device of claim 15 wherein a height position of the spindle motor is variable by the skew control circuit when a skew is detected and the second disc type is detected.

19. The disc driving device of claim 15 wherein the skew control circuit controls a tilt of the optical pickup.

* * * * *